(12) United States Patent
Slabaugh et al.

(10) Patent No.: US 8,218,910 B2
(45) Date of Patent: Jul. 10, 2012

(54) 3D BALL SKINNING USING PARTIAL DIFFERENTIAL EQUATIONS FOR GENERATION OF SMOOTH TUBULAR SURFACES

(75) Inventors: Gregory G. Slabaugh, London (GB);
Jaroslaw Rossignac, Atlanta, GA (US);
Brian Whited, Memphis, TN (US);
Tong Fang, Morganville, NJ (US);
Gozde Unal, Plainsboro, NJ (US)

(73) Assignee: Siemens Aktiengesellschaft, München (DE)

( * ) Notice: Subject to any disclaimer, the term of this patent is extended or adjusted under 35 U.S.C. 154(b) by 693 days.

(21) Appl. No.: 12/413,913

(22) Filed: Mar. 30, 2009

(65) Prior Publication Data

US 2010/0045671 A1     Feb. 25, 2010

Related U.S. Application Data

(60) Provisional application No. 61/091,494, filed on Aug. 25, 2008.

(51) Int. Cl.
*G06K 9/32*     (2006.01)
(52) U.S. Cl. .......................... 382/300; 345/420
(58) Field of Classification Search ............... 382/130, 382/173, 128; 345/419; 703/2
See application file for complete search history.

(56) References Cited

OTHER PUBLICATIONS

Kaklis et al: "Sectional-curvature preserving skinning surfaces", Elsevier Science, 1996.*
Cheng et al: "Guaranteed Quality Triangulation of Molecular Skin Surfaces", IEEE-2005.*

* cited by examiner

*Primary Examiner* — Samir Ahmed
*Assistant Examiner* — Ruiping Li
(74) *Attorney, Agent, or Firm* — Donald B. Paschburg; F. Chau & Associates, LLC

(57) ABSTRACT

A method of computing a continuous interpolation of a discrete set of three-dimensional (3D) balls, including generating an initial skin, wherein the initial skin is a surface comprised of splines and wherein the splines touch each ball along a circle that is tangent to the ball, solving a first differential equation to minimize the initial skin's surface area or solving a second differential equation to minimize a squared mean curvature of the initial skin's surface, wherein the result of solving the first or second differential equations is an updated skin; and repeating the steps of solving the first or second differential equations for the updated skin, and then, repeating the steps of solving the first or second differential equations for each subsequently updated skin until a desired skin is realized.

19 Claims, 14 Drawing Sheets

(a)

(b)

(c)

(a)

(b)

(c)

(d)

(e)

(f)

(a)

(b)

3D BALL SKINNING USING PARTIAL DIFFERENTIAL EQUATIONS FOR GENERATION OF SMOOTH TUBULAR SURFACES

CROSS-REFERENCE TO RELATED APPLICATION

This application claims the benefit of U.S. Provisional Application No. 61/091,494, filed Aug. 25, 2008, the disclosure of which is incorporated by reference herein in its entirety.

BACKGROUND OF THE INVENTION

1. Technical Field

The present invention relates to three-dimensional (3D) ball skinning.

2. Discussion of the Related Art

The geometric problem of ball skinning is the computation of a continuous interpolation of a discrete set of balls, for example. This problem arises in numerous applications, including character skinning, molecular surface model generation, and modeling of tubular structures, etc.

In computer animation, often an articulated object or character is constructed using a layered representation consisting of a skeletal structure and a corresponding geometric skin, see e.g., K. Singh, E. Kokkevis, Skinning Characters using Surface Oriented Free-Form Deformations, in: Graphics Interface, 2000, pp. 35-42. Here, the skeleton has fewer degrees of freedom and is simpler to adjust by an animator. Given a new skeletal pose, the skinning algorithm is responsible for deforming the geometric skin to respond to the motion of the underlying skeleton. The skinning problem is also a special case of the problem of computing the envelopes of families of quadrics, which have been investigated by Peternell in, M. Peternell, Rational Parameterizations for Envelopes of Quadric Families, Ph.D. thesis, University of Technology, Vienna, Austria (1997), via the use of cyclographic maps. Rossignac and Schaefer in, J. Rossignac, S. Schaefer, J-splines, Computer Aided Design 40 (10-11) (2008) 1024-132, presented J-splines, which produce smooth curves from a set of ordered points using a subdivision framework.

The problem of ball skinning appears frequently in the context of computational chemistry and molecular biology, when generating surface meshes for molecular models, see e.g., H. Cheng, X. Shi, Quality Mesh Generation for Molecular Skin Surfaces Using Restricted Union of Balls, in: IEEE Visualization, 2005, H. Edelsbrunner, Deformable smooth surface design, Discrete and Computational Geometry 21 (1) (1999) 87-115 and N. Kruithov, G. Vegter, Envelope Surfaces, in: Annual Symposium on Computational Geometry, 2006, pp. 411-420. Several algorithms exist to skin a molecular model to produce a $C^1$ continuous surface that is tangent smooth and has high mesh quality. These methods are typically either based on Delaunay triangulation like Cheng's or by finding the isosurface of an implicit function like Kruithov's. The work of Kruithov et al. derives a special subset of skins that is piece-wise quadratic. When dealing with a continuous family of balls, the skin may be computed as the envelope of the infinite union of the circles of intersection of two consecutive balls of infinitely close center. While the surfaces generated by these methods are tangent to the balls and have smoothness at the point of tangency, none of these existing methods provides an optimally smooth skin.

SUMMARY OF THE INVENTION

In an exemplary embodiment of the present invention, a method of computing a continuous interpolation of a discrete set of three-dimensional (3D) balls, comprises: generating an initial skin, wherein the initial skin is a surface comprised of splines and wherein the splines touch each ball along a circle that is tangent to the ball; solving a first differential equation to minimize the initial skin's surface area or solving a second differential equation to minimize a squared mean curvature of the initial skin's surface, wherein the result of solving the first or second differential equations is an updated skin; and repeating the steps of solving the first or second differential equations for the updated skin, and then, repeating the steps of solving the first or second differential equations for each subsequently updated skin until a desired skin is realized.

A circle on a ball $B^i$ is in a plane with normal $N^i=[\cos \theta^i \sin \phi^i, \sin \phi^i \sin \phi^i, \cos \phi^i]^T$ that passes through the ball center $c^i$ and intersects the ball $B^i$, $q(u)$ is a point on the circle and is defined by $q(u)=\hat{x} \cos u + \hat{y} \sin u$, and a point $p^i(u)$ on a circle through which a spline passes is defined by $p^i(u)=c^i+r^i R^i q(u)$, where $r^i$ is a radius of an ith ball, and $R^i$ is a rotation matrix specified by $N^i$.

The rotation matrix $R^i$ is $$R^i = R(\theta^i, \phi^i) = \begin{bmatrix} \cos\theta^i \cos\phi^i & -\sin\theta^i & \cos\theta^i \sin\phi^i \\ \sin\theta^i \cos\phi^i & \cos\theta^i & \sin\theta^i \sin\phi^i \\ -\sin\phi^i & 0 & \cos\phi^i \end{bmatrix}.$$

The initial skin is represented by $S(u,v)$, where $S(u,v)$ is a collection of continuous segments $S^i(u,v)$, where an $S^i(u,v)$ is specified by $A^i(u), B^i(u), C^i(u), D^i(u)$, where $A^i(u)=-2p^{i+1}(u)+2p^i(u)+t^i N^i+t^{i+1} N^{i+1}$, $B^i(u)=3p^{i+1}(u)-3p^i(u)-2t^i N^i-t^{i+1} N^{i+1}$, $C^i(u)=t^i N^i$, and $D^i(u)=p^i(u)$.

The first differential equation is represented by $$\frac{\partial J^a}{\partial \omega^k} = \frac{1}{2} \int \int \frac{\frac{\partial E^i}{\partial \omega^k} G^i + E^i \frac{\partial G^i}{\partial \omega^k} - 2F^i \frac{\partial F^i}{\partial \omega^k}}{[E^i G^i - (F^i)^2]^{\frac{1}{2}}} du dv +$$

$$\frac{1}{2} \int \int \frac{\frac{\partial E^{i-1}}{\partial \omega^k} G^{i-1} + E^{i-1} \frac{\partial G^{i-1}}{\partial \omega^k} - 2F^{i-1} \frac{\partial F^{i-1}}{\partial \omega^k}}{[E^{i-1} G^{i-1} - (F^{i-1})^2]^{\frac{1}{2}}} du dv.$$

$$J^a = \int \int \sqrt{EG - F^2} \, du dv, \, w^k \in [\theta^i, \phi^i] \forall i,$$

$$E = S_v \cdot S_u, \, F = S_u \cdot S_v,$$

and $$G = S_v \cdot S_v.$$

The second differential equation is represented by $$\frac{\partial J^c}{\partial \omega^k} = \int \int 2H^i \begin{bmatrix} \frac{\frac{\partial e^i}{\partial \omega^k} G^i + e^i \frac{\partial G^i}{\partial \omega^k} - 2 \frac{\partial f^i}{\partial \omega^k} F^i - }{2f^i \frac{\partial F^i}{\partial \omega^k} + \frac{\partial g^i}{\partial \omega^k} E^i + g^i \frac{\partial E^i}{\partial \omega^k}} \\ \frac{2(E^i G^i - (F^i)^2)}{(e^i G^i - 2f^i F^i + g^i E^i) \cdot} \\ \frac{\left(\frac{\partial E^i}{\partial \omega^k} G^i + E^i \frac{\partial G^i}{\partial \omega^k} - 2 \frac{\partial F^i}{\partial \omega^k} F^i\right)}{2(E^i G^i - (F^i)^2)^2} \end{bmatrix} du dv +$$

-continued $$\int\int 2H^{i-1}\begin{bmatrix}\dfrac{\partial e^{i-1}}{\partial \omega^k}G^{i-1}+e^{i-1}\dfrac{\partial G^{i-1}}{\partial \omega^k}-2\dfrac{\partial f^{i-1}}{\partial \omega^k}F^{i-1}-\\[4pt]\dfrac{2f^{i-1}\dfrac{\partial F^{i-1}}{\partial \omega^k}+\dfrac{\partial g^{i-1}}{\partial \omega^k}E^{i-1}+g^{i-1}\dfrac{\partial E^{i-1}}{\partial \omega^k}}{2(E^{i-1}G^{i-1}-(F^{i-1})^2)}-\\[4pt](e^{i-1}G^{i-1}-2f^{i-1}F^{i-1}+g^{i-1}E^{i-1})\cdot\\[4pt]\dfrac{\left(\dfrac{\partial E^{i-1}}{\partial \omega^k}G^{i-1}+E^{i-1}\dfrac{\partial G^{i-1}}{\partial \omega^k}-2\dfrac{\partial F^{i-1}}{\partial \omega \omega^k}F^{i-1}\right)}{2(E^{i-1}G^{i-1}-(F^{i-1})^2)^2}\end{bmatrix}dudv.$$

$J^c = \iint H^2 du dv$, $w^k \in [\theta^i, \phi^i] \forall i$, $E = S_u \cdot S_u$, $F = S_u \cdot S_v$, $G = S_v \cdot S_v$, $e = M \cdot S_{uu}$, $f = M \cdot S_{uv}$, and $g = M \cdot S_{vv}$, where M is the surface normal.

The method further comprises combining the first and second differential equations to generate the updated skin, wherein the first and second differential equations are combined by the following equation $$\frac{\partial J}{\partial w^k}=(1-k)\frac{\partial J^a}{\partial w^k}+\frac{\partial J^c}{\partial w^k},$$

where $$\frac{\partial J^a}{\partial w^k}$$

is the first differential equation and $$\frac{\partial J^c}{\partial w^k}$$

is the second differential equation.

The first and second differential equations are used in a gradient descent procedure to find the desired skin.

The gradient descent procedure manipulates parameters $w^i = [\theta^i, \phi^i]^T$ of each ball i, where $w^i(n+1) = w^i(n) - \Delta t \nabla J_{w^i(n)}$, $\forall i$ to find the desired skin.

In an exemplary embodiment of the present invention, a method of modeling a tubular structure, comprises: imaging a tubular structure; placing a plurality of balls in the tubular structure; and finding a skin that smoothly interpolates the balls, wherein finding the skin comprises: generating an initial skin, wherein the initial skin is a surface comprised of splines and wherein the splines touch each ball along a circle that is tangent to the ball; solving a first differential equation to minimize the initial skin's surface area or solving a second differential equation to minimize a squared mean curvature of the initial skin's surface, wherein the result of solving the first or second differential equations is an updated skin; and repeating the steps of solving the first or second differential equations for the updated skin, and then, repeating the steps of solving the first or second differential equations for each subsequently updated skin until the skin that smoothly interpolates the balls is realized, wherein the skin that smoothly interpolates the balls is a model of the tubular structure.

The tubular structure is an anatomical structure.
The tubular structure is imaged by a scanner.
The balls are ordered.

In an exemplary embodiment of the present invention, a system of computing a continuous interpolation of a discrete set of 3D balls, comprises: a memory device for storing a program; and a processor in communication with the memory device, the processor operative with the program to perform a method, the method comprising: generating an initial skin, wherein the initial skin is a surface comprised of splines and wherein the splines touch each ball along a circle that is tangent to the ball; solving a first differential equation to minimize the initial skin's surface area or solving a second differential equation to minimize a squared mean curvature of the initial skin's surface, wherein the result of solving the first or second differential equations is an updated skin; and repeating the steps of solving the first or second differential equations for the updated skin, and then, repeating the steps of solving the first or second differential equations for each subsequently updated skin until a desired skin is realized.

The foregoing features are of representative embodiments and are presented to assist in understanding the invention. It should be understood that they are not intended to be considered limitations on the invention as defined by the claims, or limitations on equivalents to the claims. Therefore, this summary of features should not be considered dispositive in determining equivalents. Additional features of the invention will become apparent in the following description, from the drawings and from the claims.

DETAILED DESCRIPTION OF EXEMPLARY EMBODIMENTS

Figure 1:
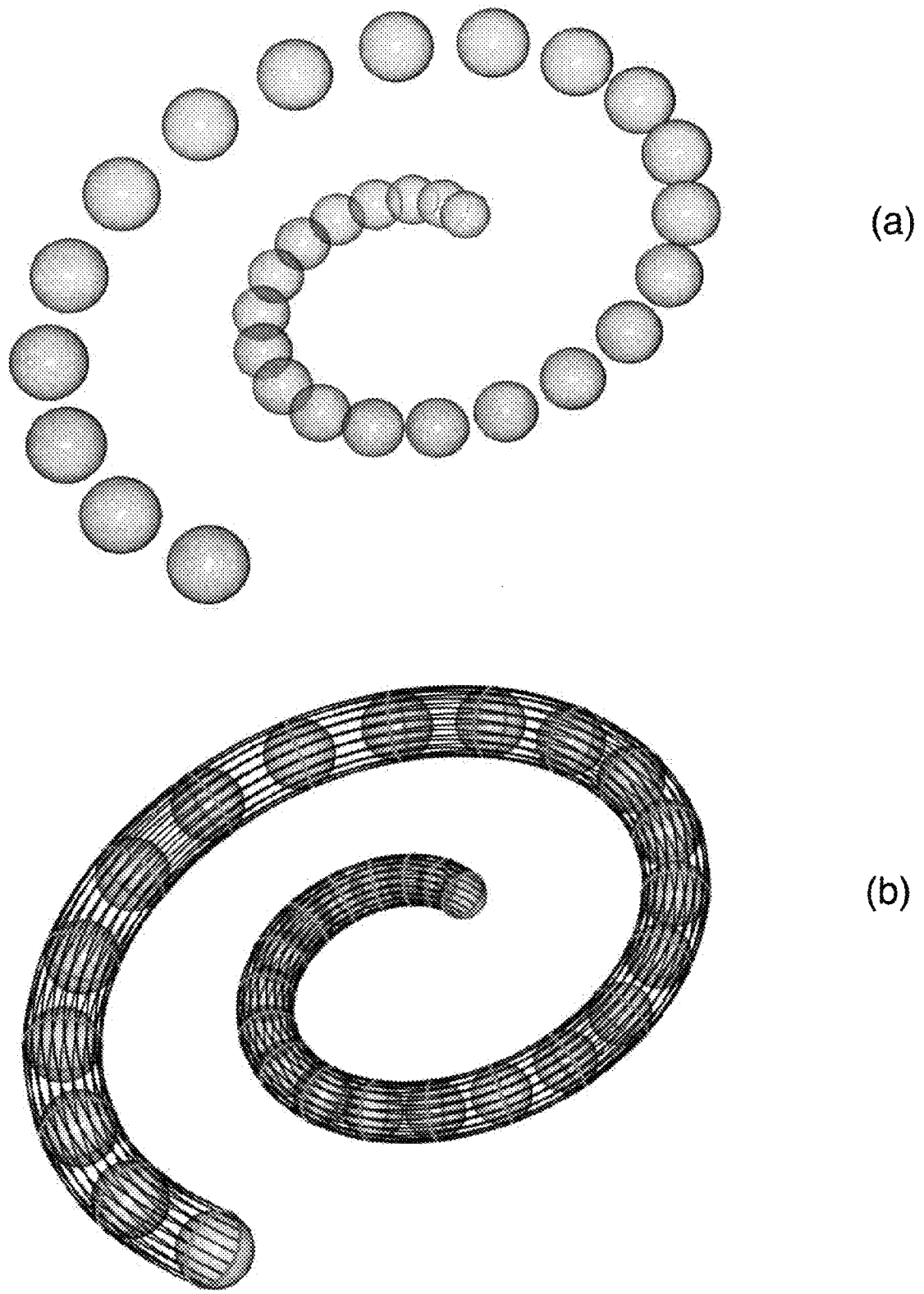
FIG. 1 is ball skinning according to an exemplary embodiment of the present invention.

In an exemplary embodiment of the present invention, we are interested in modeling the geometry of a blood vessel that has been identified using Pearling as described by B. Whited, J. Rossignac, G. Slabaugh, T. Fang, G. Unal, Pearling: 3D Interactive Extraction of Tubular Structures from Volumetric Images, in: Interaction in Medical Image Analysis and Visualization, held in conjunction with MICCAI, 2007. Pearling is a ball packing algorithm that places numerous balls of different radii so that they fit snugly inside an imaged vessel. Given these balls, we would like to find a $C^1$ skin that smoothly interpolates the balls. This surface can then be used for visualization of the blood vessel, simulation of blood flows using computational fluid dynamics, as well as measurements such as volume or surface area. We note that the problem of two-dimensional (2D) ball skinning was addressed in our paper, G. Slabaugh, G. Unal, T. Fang, J. Rossignac, B. Whited, Variational Skinning of an Ordered Set of Discrete 2D Balls, in: Geometric Modeling and Processing, 2008 and U.S. Patent Application Publication No. 2008/0109192, entitled "System and method for variational ball skinning for geometric modeling of ordered balls", the disclosures of which are incorporated by reference herein in their entirety. In the paper, for example, we extended the methodology to skinning three-dimensional (3D) balls. In accordance with the present invention, the problem has a similar conceptual formulation based on differential equations; however, the geometry is notably different: instead of minimizing the arc length and curvature of a curve, we minimize the surface area and mean curvature of a surface. Furthermore, the geometry of contact between the skin and the balls, as well as the differential geometry of the skin is significantly different in the 3D case.

In accordance with the present invention, our approach produces a surface that minimizes a convex combination of surface area and squared mean curvature terms. Such surfaces are loosely referred to as "minimal surfaces" in the literature. It has been shown in the surface evolution literature that, for unconstrained surfaces, these terms result in curvature and Willmore flows, see e.g., J. A. Sethian, Level Set Methods and Fast Marching Methods Evolving Interfaces in Computational Geometry, Fluid Mechanics, Computer Vision, and Materials Science, Cambridge University Press, 1999 and K. E., R. Schatzle, Gradient Flow for the Willmore functional, Comm. Anal. Geom. 10 (5), respectively. By adding the additional constraint that the skin must pass through a circle of intersection with each ball, we significantly reduce the dimensionality of the optimization.

In a method of ball skinning according to an exemplary embodiment of the present invention, we model the skin as a $C^1$ surface, which, by construction, must touch each ball along a circle that is tangent to the ball. We then provide two novel derivations, one for deforming this constrained surface to minimize its surface area; and a second derivation for minimizing its squared mean curvature. The result of these derivations is differential equations, which we then solve to update a given surface to its optimal position. We then show experimental examples of how these differential equations are used to perform optimally smooth skinning of balls.

Figure 2:
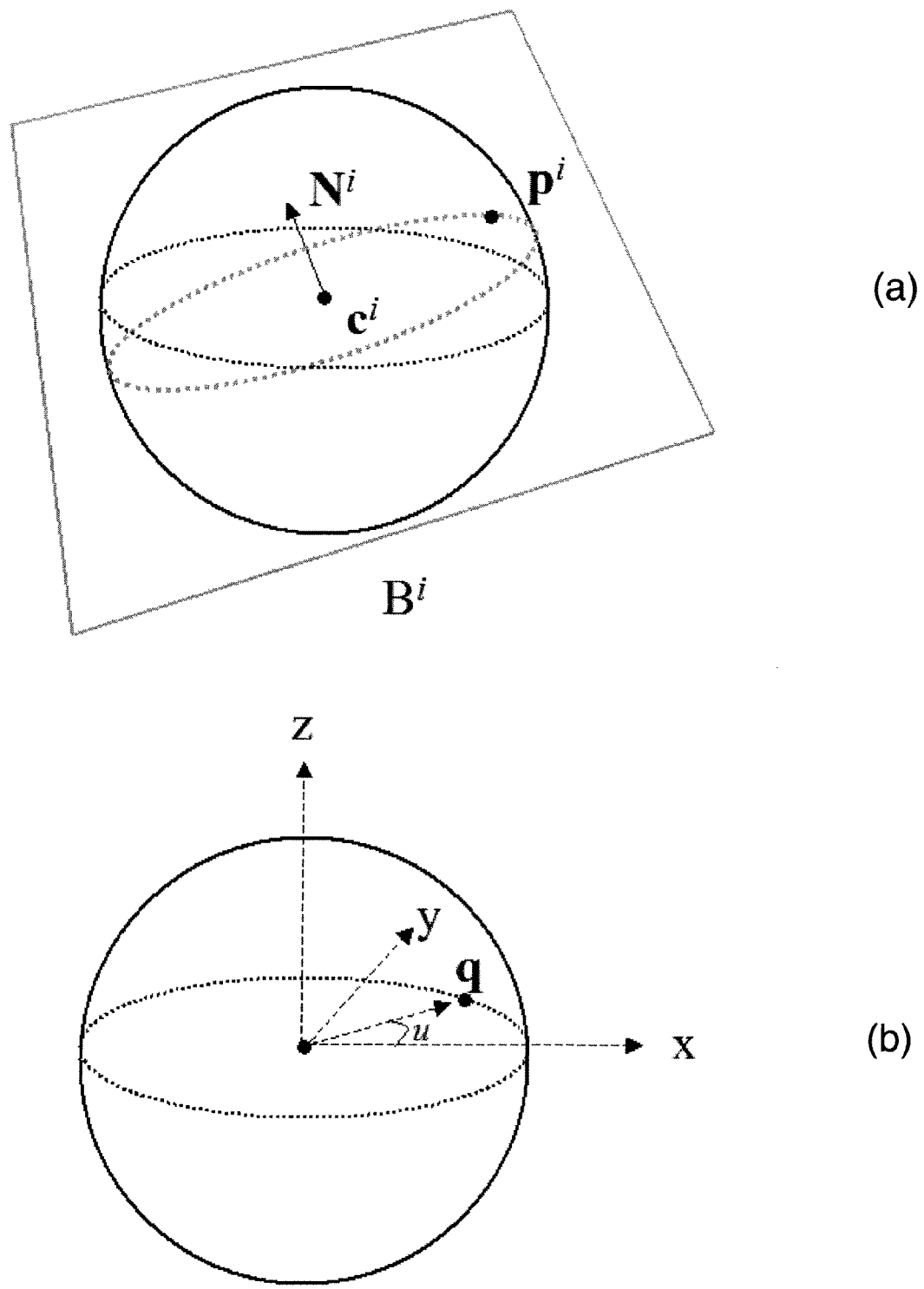
FIG. 2 is a representation of a circle of contact according to an exemplary embodiment of the present invention.

In accordance with an exemplary embodiment of the present invention, with regard to the representation of a skin's surface, we require the skin to pass through a circle on the ith ball $B^1$, as depicted in FIG. 2(a). This circle resides in a plane with normal $N^i = [\cos \theta^i \sin \phi^i, \sin \phi^i, \sin \phi^i \sin \phi^i, \cos \phi^i]^T$ that passes though the ball center $c^i$ and intersects $B^i$.

Let $q(u)$ be a point on the unit circle in the $z=0$ plane, as shown in FIG. 2(b). We can parameterize $q(u)$ as $$q(u) = \hat{x} \cos u + \hat{y} \sin u, \qquad (1)$$

where u is a parameterization angle. We can then express $p^i(u)$, a point on the circle of $B^i$ as $$p^i(u) = c^i + r^i R^i q(u), \qquad (2)$$

where $r^i$ is the radius of the i th ball, and $R^i$ is a rotation matrix specified by $N^i$ as $$R^i = R(\theta^i, \phi^i) = \begin{bmatrix} \cos\theta^i \cos\phi^i & -\sin\theta^i & \cos\theta^i \sin\phi^i \\ \sin\theta^i \cos\phi^i & \cos\theta^i & \sin\theta^i \sin\phi^i \\ -\sin\phi^i & 0 & \cos\phi^i \end{bmatrix} \qquad (3)$$

$p^i(u)$ provides a way to parameterize the circle on each ball. We would like to form a parametric skin $S(u,v)$ that satisfies several geometric criteria:
 (1) The skin should be modeled by a circle that contacts each ball.
 (2) The skin should be tangent to each ball along the circle of contact.
 (3) The skin should optimize an energy functional composed of surface area and mean curvature terms.

Figure 3:
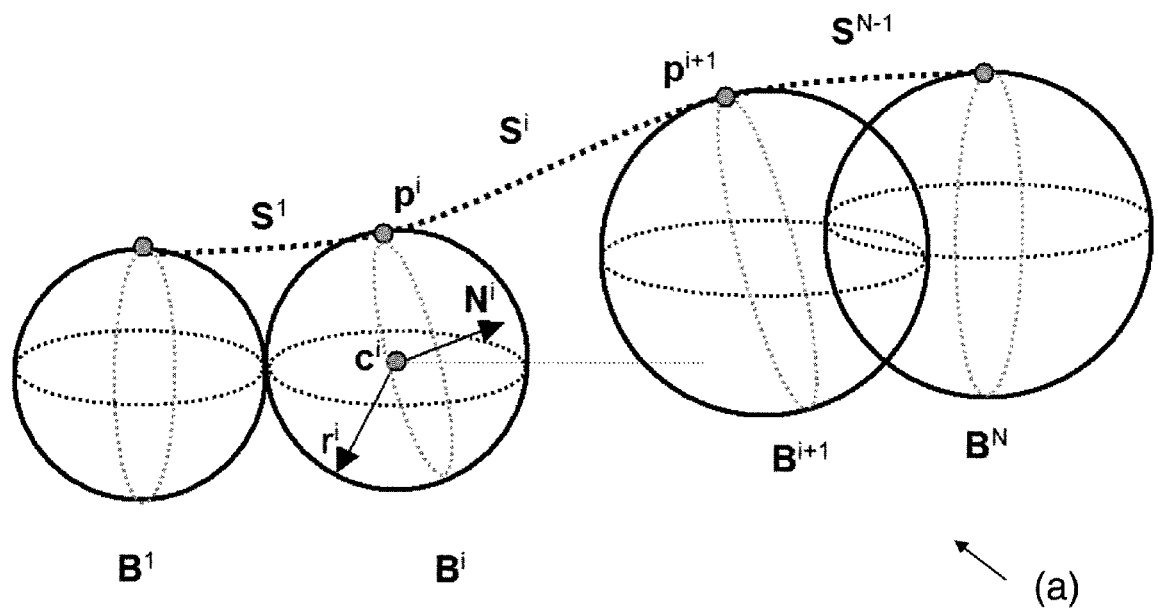
FIG. 3 shows segments and a spline according to an exemplary embodiment of the present invention.
Figure 3:
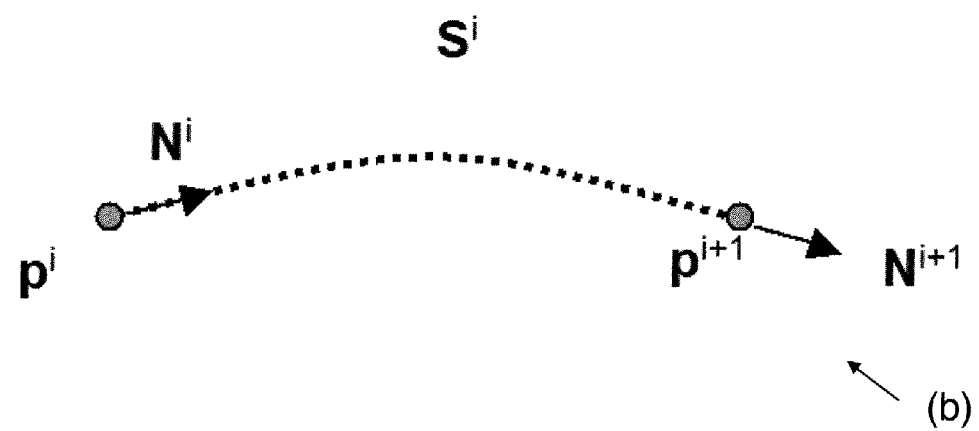

We compose the skin $S(u,v)$ as a set of segments $S^i(u,v)$ for $i=1 \ldots N-1$, where N is the total number of balls, as depicted in FIG. 3. To form the segment $S^i(u,v)$, we would like to generate a spline-based surface that connects the circles on adjacent balls. Various spline representations (such as Catmull-Rom, 4-point, etc.) are possible for modeling segments using a set of splines. Each spline starts at point $p^i(u)$ in direction $N^i$, and ends at point $p^{i+1}(u)$ in direction $N^{i+1}$, with $$S^i(u,v) = A^i(u)v^3 + B^i(u)v^2 + C^i(u)v + D^i(u), \qquad (4)$$

since the four constraints require four degrees of freedom. For the i th segment, $A^i(u), B^i(u), C^i(u)$, and $D^i(u)$ are coefficients, and $v \in [0,1]$ is a parameterization variable.

Each segment $S^i(u,v)$ of the skin is defined by the Hermite interpolation of the boundary conditions, specifically, $$S^i(u,v)|_{v=0} = p^i(u),$$

$$\frac{\partial S^i(u,v)}{\partial v}\bigg|_{v=0} = t^i N^i,$$

$$S^i(u,v)|_{v=1} = p^{i+1}(u),$$

and $$\frac{\partial S^i(u,v)}{\partial v}\bigg|_{v=1} = t^{i+1} N^{i+1},$$

where, for each i, $t^i$ is a stiffness coefficient that controls the influence of the normal $N^i$. Each $t^i$ is fixed to be half the distance between the next and previous ball centers (for the first and last balls, it is the distance between the ball center and its neighbor ball center) for all examples in this disclosure. Such a stiffness encourages smoothness of the connecting segments at a circle, and is based on the central difference approximation of the first derivative computed using ball centers. We note however that straighter segments can be achieved by scaling the stiffness by a coefficient less than one.

With these constraints, and the derivative of the segment, $$\frac{\partial S^i(u,v)}{\partial v} = 3A^i(u)v^2 + 2B^i(u)v + C^i(u), \qquad (5)$$

we obtain a system of four equations for the four coefficients: $D^i(u) = p^i(u), C^i(u) = t^i N^i, A^i(u) + B^i(u) + C^i(u) + D^i(u) = p^{i+1}(u)$, and $3A^i(u) + 2B^i(u) + C^i(u) = t^{i+1} N^{i+1}$, which is easily solved, yielding $$A^i(u) = -2p^{i+1}(u) + 2p^i(u) + t^i N^i + t^{i+1} N^{i+1}$$

$$B^i(u) = 3p^{i+1}(u) - 3p^i(u) - 2t^i N^i - t^{i+1} N^{i+1}$$

$$C^i(u) = t^i N^i$$

$$D^i(u) = p^i(u) \quad (6)$$

Thus, we have a way of describing the skin $S(u,v)$ as a collection of $N-1$ $C^1$ continuous segments $S^i(u,v)$. Segment $S^i(u,v)$ in turn is specified by the coefficients $A^i(u), B^i(u), C^i(u), D^i(u)$, and these coefficients are functions of the circles $p^i(u), p^{i+1}(u)$, and the normals $N^i$ and $N^{i+1}$. Finally, the circles and normals are, in turn, functions of the angles $\phi^i, \phi^{i+1}, \phi^i, \phi^{i+1}$.

In accordance with an exemplary embodiment of the present invention, with regard to surface area minimization, we derive differential equations to evolve the parameters of the skin to minimize the skin's surface area.

From differential geometry, it is well known that the surface area is given by $$J^a = \iint \sqrt{EG - F^2} \, du \, dv, \quad (7)$$

where $$E = S_u \cdot S_u \quad (8)$$

$$F = S_u \cdot S_v \quad (9)$$

$$G = S_v \cdot S_v \quad (10)$$

are coefficients of the first fundamental form.

Since $S(u,v)$ is expressed as a sum of $N-1$ segments, this is equivalent to $$J^a = \sum_{i=1}^{N-1} \iint \sqrt{E^i G^i - (F^i)^2} \, du \, dv. \quad (11)$$

We take the derivative of Equation 11 with respect to the parameter $w^k$, where $w^k \in [\theta^i, \phi^i] \forall i$. This will give us a gradient direction that we can use in a numerical gradient descent procedure to find the angles that minimize the surface area of the skin. Since $\theta^i$ and $\phi^i$ affect only the i th and i–1st segments, we can replace the summation with two surface integrals, $$\frac{\partial J^a}{\partial w^k} = \frac{\partial}{\partial w^k} \iint \sqrt{E^i G^i - (F^i)^2} \, du \, dv + \quad (12)$$

$$\frac{\partial}{\partial w^k} \iint \sqrt{E^{i-1} G^{i-1} - (F^{i-1})^2} \, du \, dv.$$

Propagating the derivative through the integrals gives $$\frac{\partial J^a}{\partial w^k} = \frac{1}{2} \iint \frac{\frac{\partial E^i}{\partial w^k} G^i + E^i \frac{\partial G^i}{\partial w^k} - 2 F^i \frac{\partial F^i}{\partial w^k}}{[E^i G^i - (F^i)^2]^{\frac{1}{2}}} \, du \, dv + \quad (13)$$

$$\frac{1}{2} \iint \frac{\frac{\partial E^{i-1}}{\partial w^k} G^{i-1} + E^{i-1} \frac{\partial G^{i-1}}{\partial w^k} - 2 F^{i-1} \frac{\partial F^{i-1}}{\partial w^k}}{[E^{i-1} G^{i-1} - (F^{i-1})^2]^{\frac{1}{2}}} \, du \, dv.$$

Derivations for the derivatives of the coefficients of the first fundamental form with respect to $w^k$ are provided near the end of this disclosure.

In accordance with an exemplary embodiment of the present invention, with regard to curvature minimization, we derive differential equations for updating the skin to minimize its curvature. In 3D there are several potential curvatures one could employ, including mean and Gaussian curvatures. In this disclosure, we focus on the mean curvature, which is closely related to the first variation of surface area. The mean curvature is given by $$H = \frac{eG - 2fF + gE}{2(EG - F^2)}, \quad (14)$$

where E,F, and G are given in the previous section, and e,f, and g come from the fundamental form, $$e = M \cdot S_{uu} \quad (15)$$

$$f = M \cdot S_{uv} \quad (16)$$

$$g = M \cdot S_{vv} \quad (17)$$

where M is the surface normal (not to be confused with N, which is the normal of the plane that intersects a ball).

Our energy is $$J^c = \iint H^2 \, du \, dv. \quad (18)$$

Since $S(u,v)$ is expressed as a sum of $N-1$ segments, this is equivalent to $$J^c = \sum_{i=1}^{N-1} \iint (H^i)^2 \, du \, dv. \quad (19)$$

As before, we would like to take the derivative of Equation 19 with respect to the parameter $w^k$, where $w^k \in [\theta^i, \phi^i] \forall i$. This will give us a gradient direction which we can use in a numerical gradient descent procedure to find the angles that minimize the curvature of the skin. Since $\theta^i$ and $\phi^i$ affect only the i th and i–1st segments, we can replace the summation with two surface integrals, $$\frac{\partial J^c}{\partial \omega^k} = \frac{\partial}{\partial \omega^k} \iint \left[ \frac{e^i G^i - 2 f^i F^i + g^i E^i}{2(E^i G^i - (F^i)^2)} \right]^2 du \, dv + \quad (20)$$

$$\frac{\partial}{\partial \omega^k} \iint \left[ \frac{e^{i-1} G^{i-1} - 2 f^{i-1} F^{i-1} + g^{i-1} E^{i-1}}{2(E^{i-1} G^{i-1} - (F^{i-1})^2)} \right]^2 du \, dv.$$

Propagating the derivative through the integrals gives $$\frac{\partial J^c}{\partial \omega^k} = \iint 2 H^i \left[ \frac{\frac{\partial e^i}{\partial \omega^k} G^i + e^i \frac{\partial G^i}{\partial \omega^k} - 2 \frac{\partial f^i}{\partial \omega^k} F^i - \frac{2 f^i \frac{\partial F^i}{\partial \omega^k} + \frac{\partial g^i}{\partial \omega^k} E^i + g^i \frac{\partial E^i}{\partial \omega^k}}{2(E^i G^i - (F^i)^2)} - \frac{(e^i G^i - 2 f^i F^i + g^i E^i) \cdot \left( \frac{\partial E^i}{\partial \omega^k} G^i + E^i \frac{\partial G^i}{\partial \omega^k} - 2 \frac{\partial F^i}{\partial \omega^k} F^i \right)}{2(E^i G^i - (F^i)^2)^2} \right] du \, dv + \quad (21)$$

-continued $$\int\int 2H^{i-1}\left[\begin{array}{c}\dfrac{\partial e^{i-1}}{\partial\omega^k}G^{i-1}+e^{i-1}\dfrac{\partial G^{i-1}}{\partial\omega^k}-2\dfrac{\partial f^{i-1}}{\partial\omega^k}F^{i-1}-\\ \dfrac{2f^{i-1}\dfrac{\partial F^{i-1}}{\partial\omega^k}+\dfrac{\partial g^{i-1}}{\partial\omega^k}E^{i-1}+g^i\dfrac{\partial E^{i-1}}{\partial\omega^k}}{2(E^{i-1}G^{i-1}-(F^{i-1})^2)}-\\ \\ \dfrac{(e^{i-1}G^{i-1}-2f^{i-1}F^{i-1}+g^{i-1}E^{i-1})\cdot}{\left(\dfrac{\partial E^{i-1}}{\partial\omega^k}G^{i-1}+E^{i-1}\dfrac{\partial G^{i-1}}{\partial\omega^k}-2\dfrac{\partial F^{i-1}}{\partial\omega^k}F^{i-1}\right)}\\ \dfrac{2(E^{i-1}G^{i-1}-(F^{i-1})^2)^2}{2(E^{i-1}G^{i-1}-(F^{i-1})^2)^2}\end{array}\right]dudv.$$

where the derivatives of the coefficients from the first fundamental form (i.e., E, F, and G) are given near the end of this disclosure and the derivatives of the coefficients from the second fundamental form (i.e., e, f and g) are analytically derived near the end of this disclosure.

In implementing a method according to an exemplary embodiment of the present invention, we combine the energies $J^a$ and $J^c$ together, as $$J=(1-k)J^a+kJ^c, \quad (22)$$

where k is a constant used to weight the surface area minimization relative to the curvature minimization. Convex combinations of the two can be selected using $k \in [0,1]$. Therefore, the combined energy minimization is given by $$\frac{\partial J}{\partial w^k}=(1-k)\frac{\partial J^a}{\partial w^k}+\frac{\partial J^c}{\partial w^k}, \quad (23)$$

where $$\frac{\partial J^a}{\partial w^k}$$

is given in Equation 13 and $$\frac{\partial J^c}{\partial w^k}$$

is provided in Equation 21. In all of the experiments in this disclosure, we fix k=0.9, to encourage smoother solutions.

These equations are a set of differential equations that can be used in a gradient descent procedure to optimize the skin by manipulating the parameters $w^i=[\theta^i,\phi^i]^T$ of each ball i. Let $w^i(n)$ be the i th ball's parameters at iteration n. We can then update the parameters by moving them in the negative gradient direction, i.e., $$w^i(n+1)=w^i(n)-\Delta t \nabla J_{w^i(n)}, \forall i, \quad (24)$$

where $\Delta t$ is a time step.

The computational complexity of the algorithm depends on the number of balls N and the number of points on the surface where the points and derivatives are evaluated. The number of points is given by LM, where L is the number of sampling points on each spline, and M is the number of splines on a segment. For each iteration of the gradient descent procedure, the computational complexity is O(NLM). The number of iterations required depends on the time step $\Delta t$ as well as how close the initial skin is to the final solution.

Figure 4:
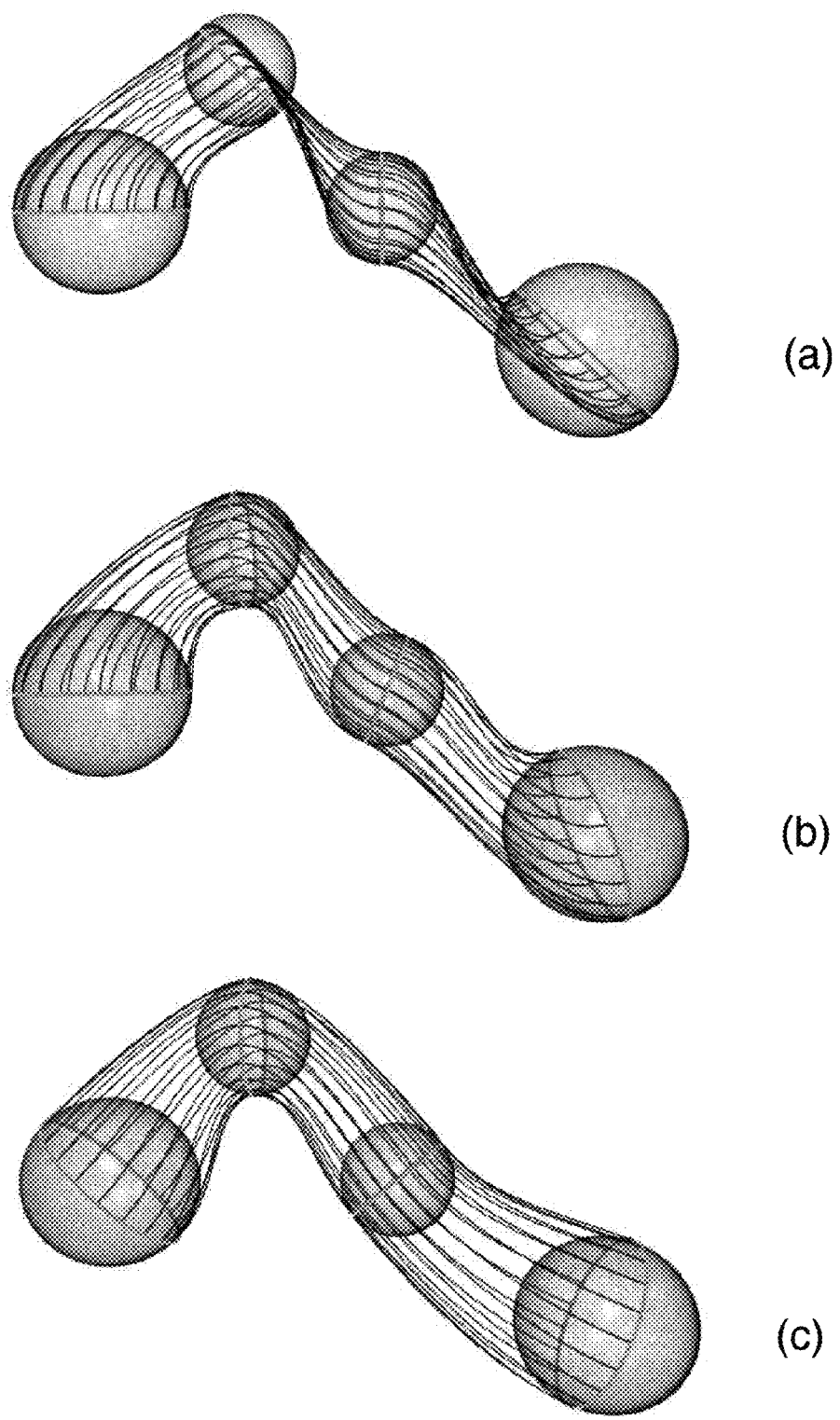
FIG. 4 is ball skinning according to an exemplary embodiment of the present invention.

A simple demonstration of ball skinning according to an exemplary embodiment of the present invention is provided in FIG. 4. Here, four balls of radius 3, 2, 2, and 3 units, respectively, were set in the xy-plane, at points $c^1=[0,0,0]^T$, $c^2=[5,0,5]^T$, $c^3=[10,0,0]^T$ and $c^4=[17,0,-5]^T$. The initial parameters for this experiment were $$w^1=[0,0]^T, w^2=\left[0,\frac{\pi}{4}\right]^T, w^3=\left[0,\frac{\pi}{2}\right]^T, \text{ and } w^4=\left[0,\frac{\pi}{4}\right]^T,$$

respectively; the initial skin is shown in FIG. 4(a). The parameters were iteratively updated using Equation 24, with L=50 and M=20 (these values for L and M are used for all experiments in this disclosure). An intermediate solution after 20 iterations is shown in FIG. 4(b); at this stage, the skin is considerably smoother while satisfying the constraints of the problem. We show the result after 40 iterations in FIG. 4(c), at which point the energy has reached a minimum and the parameters have converged. The solution (all 40 iterations) is computed in 4.3 seconds using C++ code on a machine with a 2.0 GHz processor. We render the surface as a collection of splines, and additionally show the circle of intersection on each ball. The energy of the surface, as measure using Equation 22, drops from $7.36 \times 10^9$ in FIG. 4(a) to 670 in FIG. 4(c).

Figure 5:
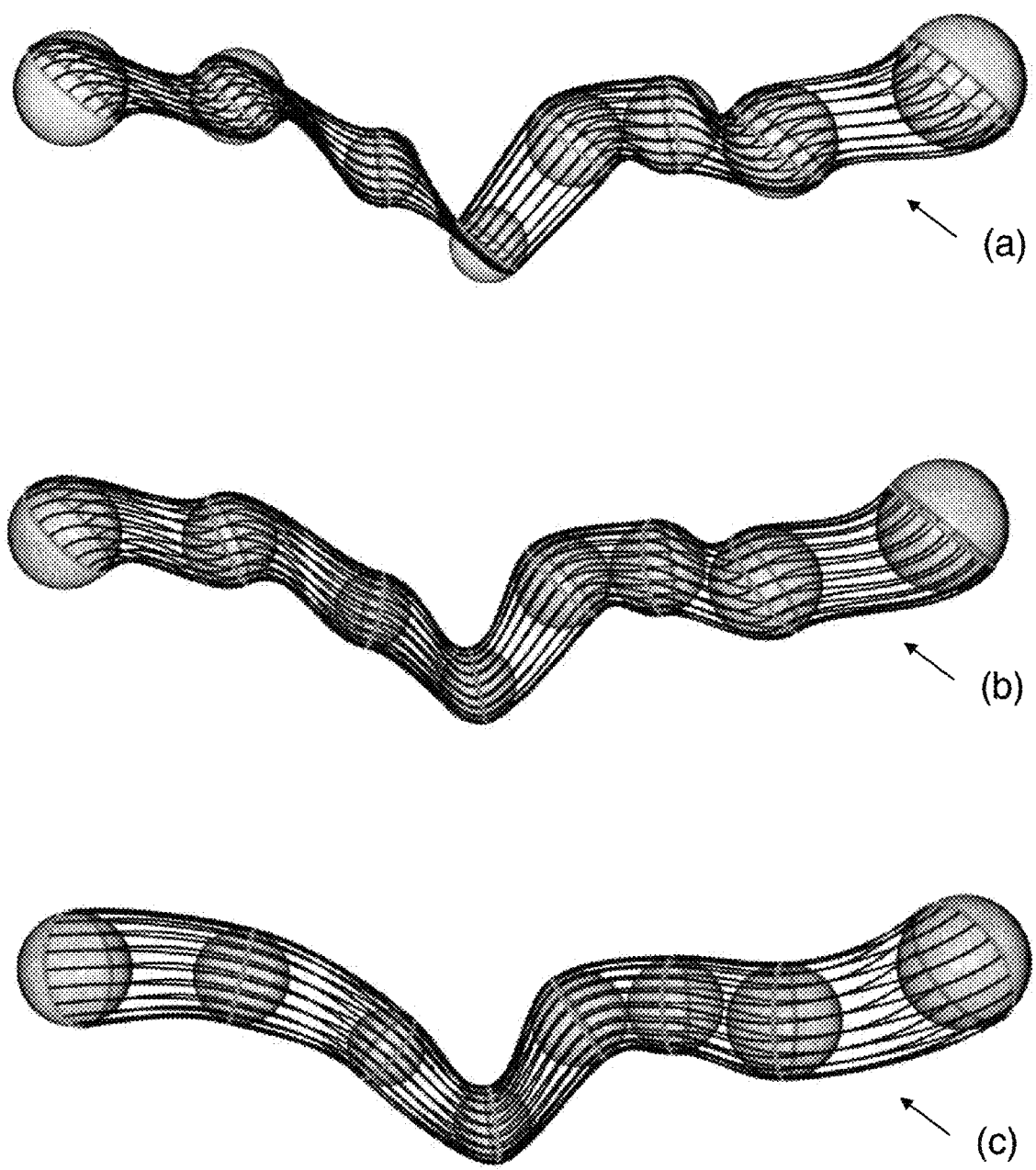
FIG. 5 is ball skinning according to an exemplary embodiment of the present invention.

FIG. 5 is a slightly more complicated demonstration of ball skinning according to an exemplary embodiment of the present invention in which some balls overlap and others do not. The initial skin in shown in FIG. 5(a), an intermediate result after 25 iterations in FIG. 5(b), and the final result upon convergence after 50 iterations in FIG. 5(c). The solutions (all 50 iterations) is computed in 10.4 seconds. The energy of the surface, as measured using Equation 22, drops from $1.86 \times 10^{10}$ in FIG. 5(a) to 1400 in FIG. 5(c).

Figure 6:
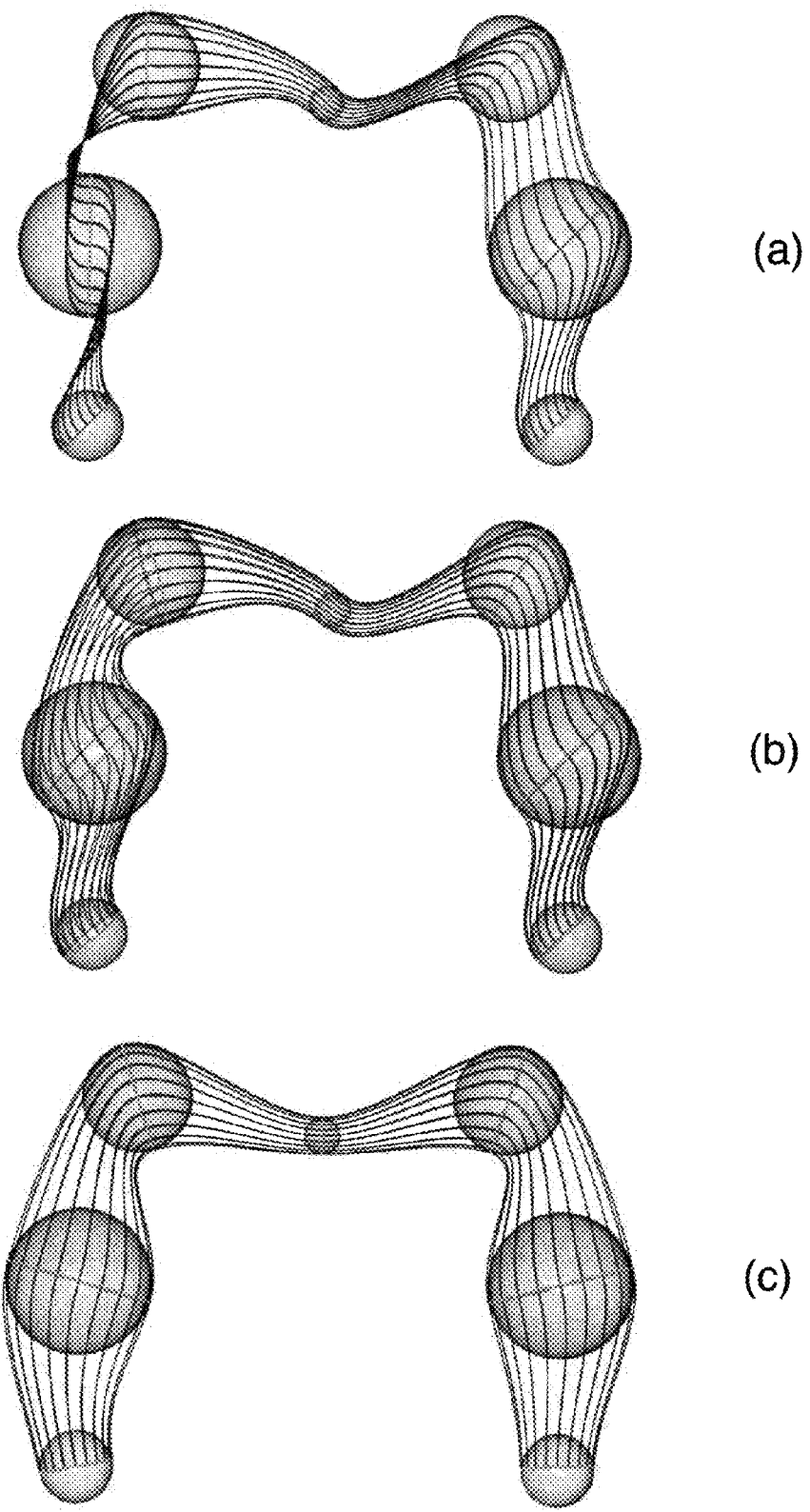
FIG. 6 is ball skinning according to an exemplary embodiment of the present invention.

FIG. 6 is a demonstration of ball skinning according to an exemplary embodiment of the present invention for a symmetric configuration of balls, but asymmetric initial conditions. The initial skin is shown in FIG. 6(a), an intermediate result after 30 iterations in FIG. 6(b), and the final result upon convergence after 60 iterations in FIG. 6(c). The solution (all 60 iterations) is computed in 8.3 seconds. The energy of the surface, as measured using Equation 22, drops from $2.79 \times 10^7$ in FIG. 6(a) to 1287 in FIG. 6(c). Note that due to the symmetry of the balls, the skin itself is symmetric upon convergence.

Figure 7:
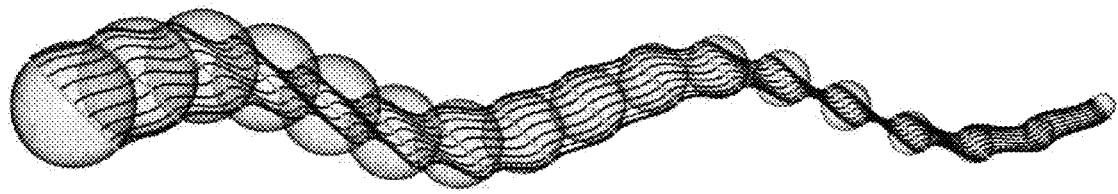
FIG. 7 is ball skinning according to an exemplary embodiment of the present invention.
Figure 7:
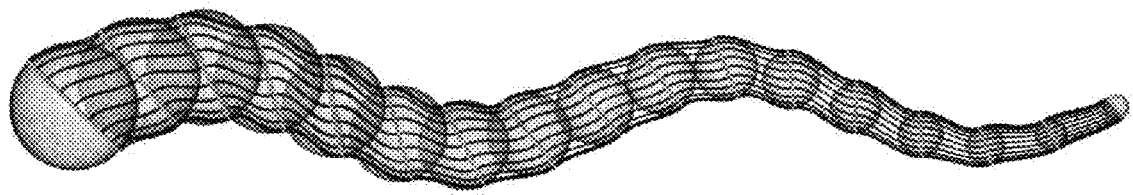
Figure 7:
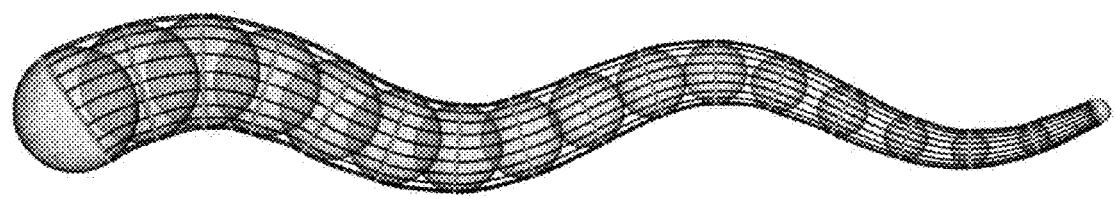

More demonstrations of ball skinning according to an exemplary embodiment of the present invention are provided in FIGS. 7 and 1. Initialization is shown in FIG. 7(a), an intermediate result after 25 iterations in FIG. 7(b) and a final result upon convergence after 50 iterations in FIG. 7(c). In FIG. 7, the balls are arranged on a sine wave and have a variable radius. In addition, some of the balls overlap while others do not. Convergence of the skinning algorithm, starting from a set of angles far from the optimal result, takes 11.4 seconds, and reduces the energy from $9.67 \times 10^5$ to 11,471. In FIG. 1, the variable radius balls are arranged in a spiral (see FIG. 1(a)). The skin (see FIG. 1(b)) is generated in 15.3 seconds.

Figure 8:
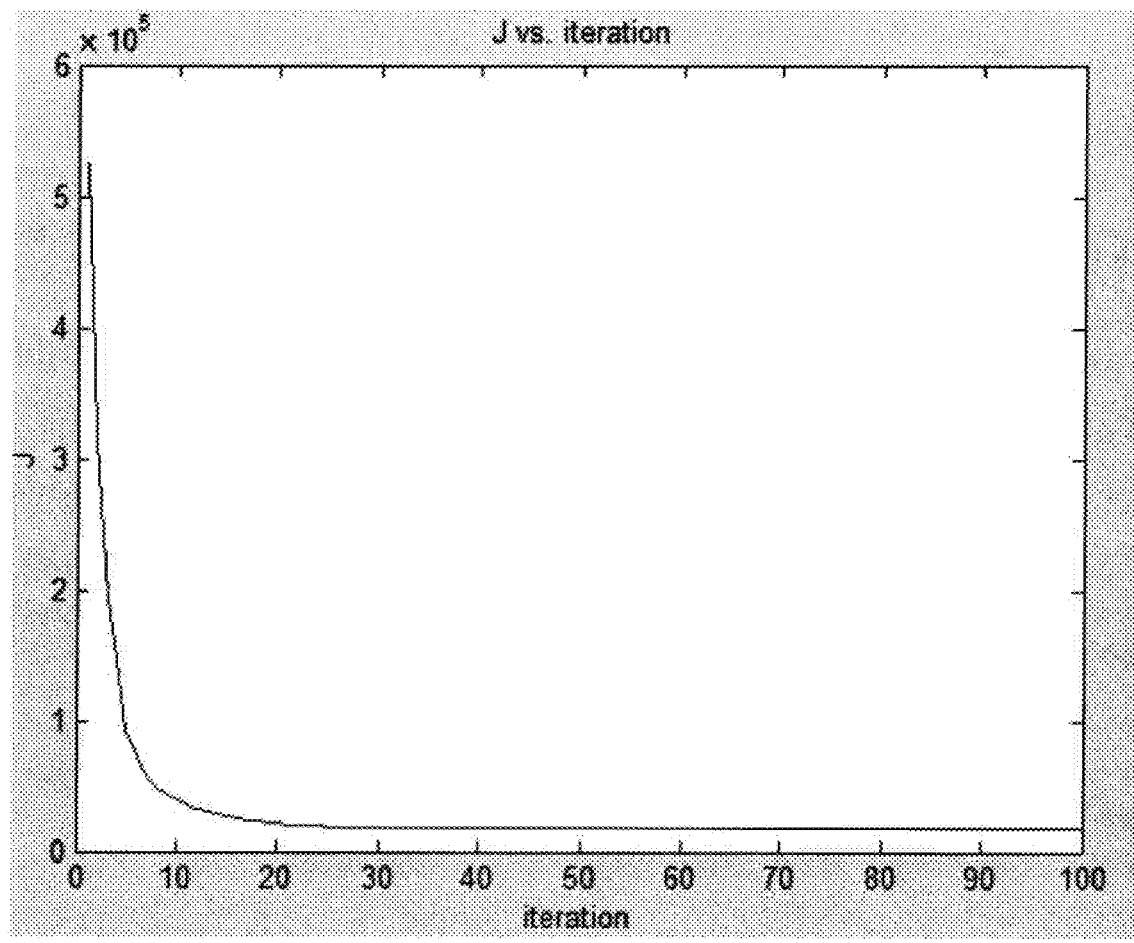
FIG. 8 is a convergence plot for the exemplary embodiment shown in FIG. 7.

In FIG. 8, we show a plot of the energy J of the surface vs. the iteration number. Note that initially, the energy is high and successive iterations reduce the energy until convergence occurs around the $30^{th}$ iteration. Upon convergence, the energy oscillates around its minimal value. This fact can be exploited as an automatic convergence criterion.

We have implemented the J-splines technique of Rossignac and Schaefer to which we compare a ball skinning method according to an exemplary embodiment of the present invention. This approach outlines a general subdivision algorithm for producing smooth curves (J-splines) from a set of ordered points. Iterative applications of the subdivision algorithm yield a family of limit curves, one of which is a quintic b-spline ($C^4$). This quintic b-spline will no longer interpolate the input points, but can be "retrofitted" as Rossignac and Schaefer describes. This retrofitting process iteratively offsets the input control points until the final curve interpolates the input, thus resulting in an interpolating $C^4$ spline. As a comparison, we used this subdivision approach to subdivide the series of balls as a four-dimensional (4D) curve (x, y, z+radius). The cross sections of the skin are then computed as circles which lie on the surface of the convex hull of every consecutive pair of balls and are also orthogonal to the line connecting their centers.

TABLE 1

| Data Set | Energy (Method according to an exemplary embodiment) | Energy (J-splines) |
|---|---|---|
| Spiral (FIG. 1) | 12387 | 12281 |
| Four balls (FIG. 4) | 670 | 12386 |
| Mixed overlap (FIG. 5) | 1400 | 3008 |
| M shape (FIG. 6) | 1287 | 34200 |
| Sine wave (FIG. 7) | 11447 | 11441 |

Table 1 presents the results of the comparison. For each skin, we computed the energy J as described in Equation 22. While the result for the spiral and sine wave was slightly lower for the J-spline method, the difference is not significant (i.e., the difference is less than 1%) in both cases and the surfaces have an identical appearance. The method according to an exemplary embodiment of the present invention demonstrates significant improvement however for the other surfaces. The primary reason for this is that with J-splines, a self-intersection occurs that results in high local curvatures and a fatter object in general, as demonstrated in FIG. 9. The method according to an exemplary embodiment of the present invention will penalize such local self-intersections and deform the spline surface so that the individual splines are smooth upon convergence.

Figure 9:
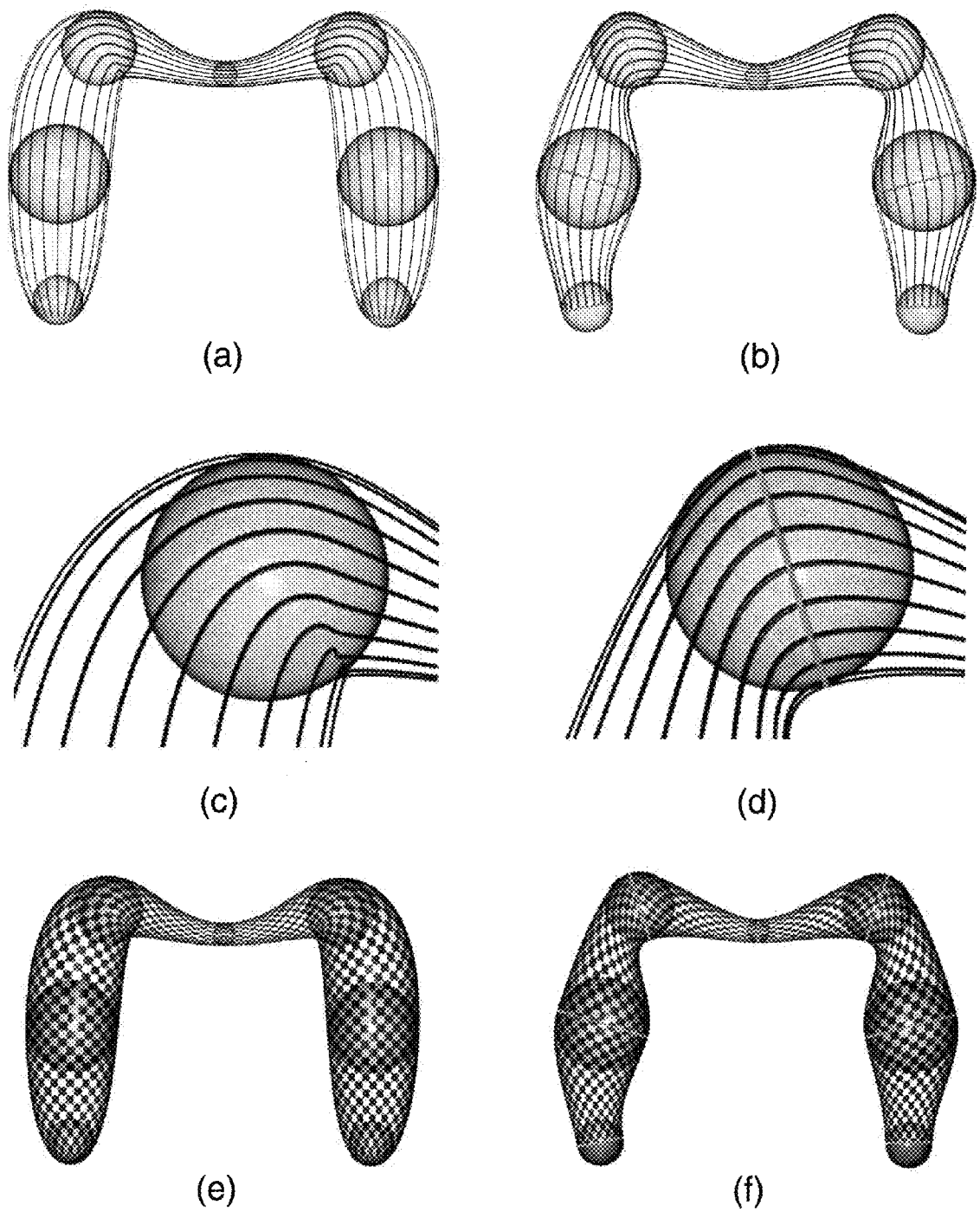
FIG. 9 is a comparison between ball skinning according to an exemplary embodiment of the present invention and J-splines.

In other words, as can be seen from FIG. 9, the method according to an exemplary embodiment of the present invention produces smoother results than J-splines. One the left, FIGS. 9(a), (c) and (e), is the J-spline skin for the example shown in FIG. 6. There are two intersections: one is shown in a zoomed view of FIG. 9(c), with the circle of contact removed for clarity. In FIG. 9(a), we show the wireframe model of the splines, and in FIG. 9(c) a texture-mapped view. One the right, FIGS. 9(b), (d) and (f) is the result of the method according to an exemplary embodiment of the present invention, which does not have self-intersection.

Figure 10A:
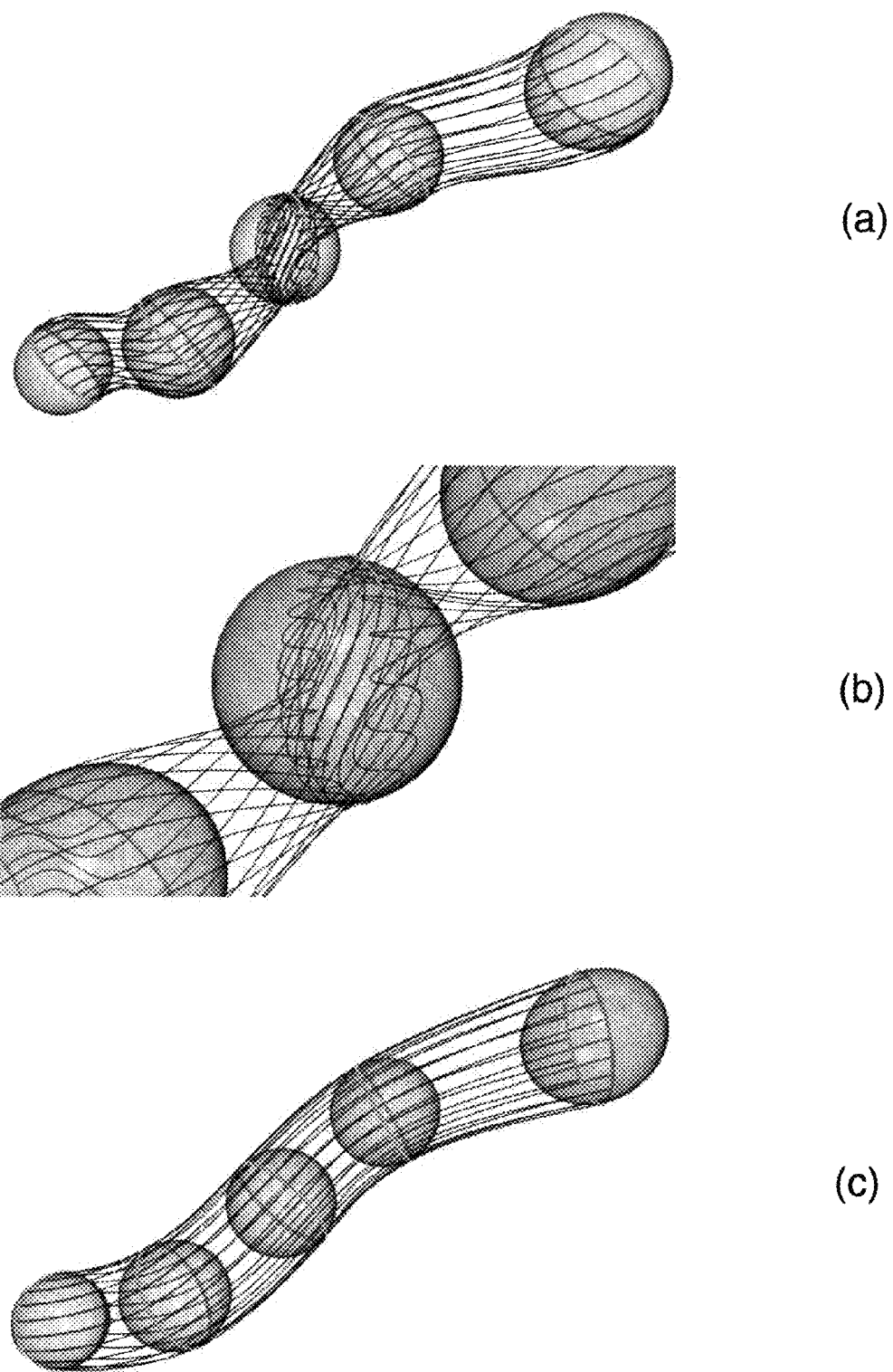
FIGS. 10A and 10B illustrate convergence to desired and undesired minima based on poor and severely poor initializations in ball skinning according to an exemplary embodiment of the present invention.
Figure 10B:
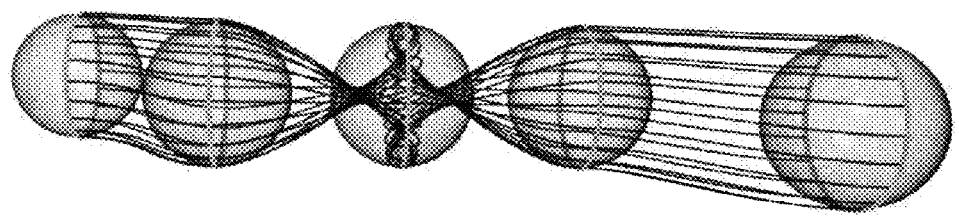
Figure 10B:
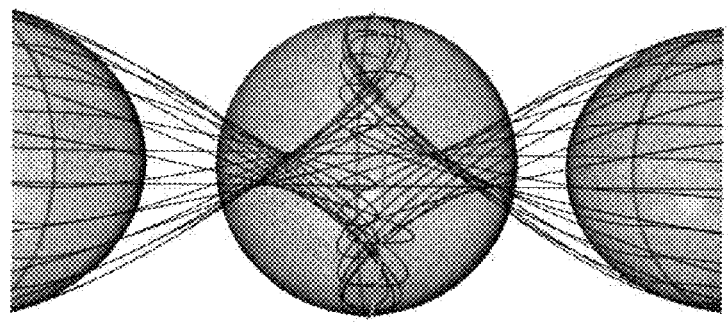
Figure 10B:
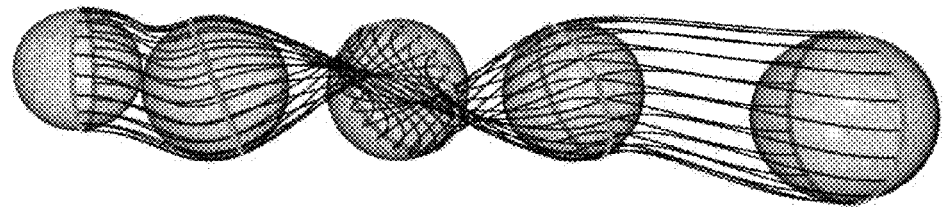

We note that our gradient descent approach guarantees a locally optimal solution; the particular solution depends on the convexity of the energy functional as well as the initial condition. In the examples shown in this disclosure, the initial skins are chosen to be far from the final solution to demonstrate the effect and robustness of the differential equations. FIG. 10(a) and a zoom in view FIG. 10(b), show a demonstration of ball skinning according to an exemplary embodiment of the present invention with a very poor initialization that has a strong self-intersection. Despite the undesirable initialization, the algorithm is able to untangle the self-intersection and produce a smooth interpolation of the balls, shown in FIG. 10(c). In FIG. 10(d) and a zoom in view FIG. 10(e), we show a demonstration of a severe self-intersection where the surface has completely folded in on itself. This initialization is not in the basin of attraction of the desired solution, so the skin upon convergence, shown in FIG. 10(f), is not the desired solution. In practice, it is typically easy to determine a good initialization by choosing an initialization for each ball such that the normal of the intersection plane points along the vector that connects adjacent ball centroids.

Figure 11:
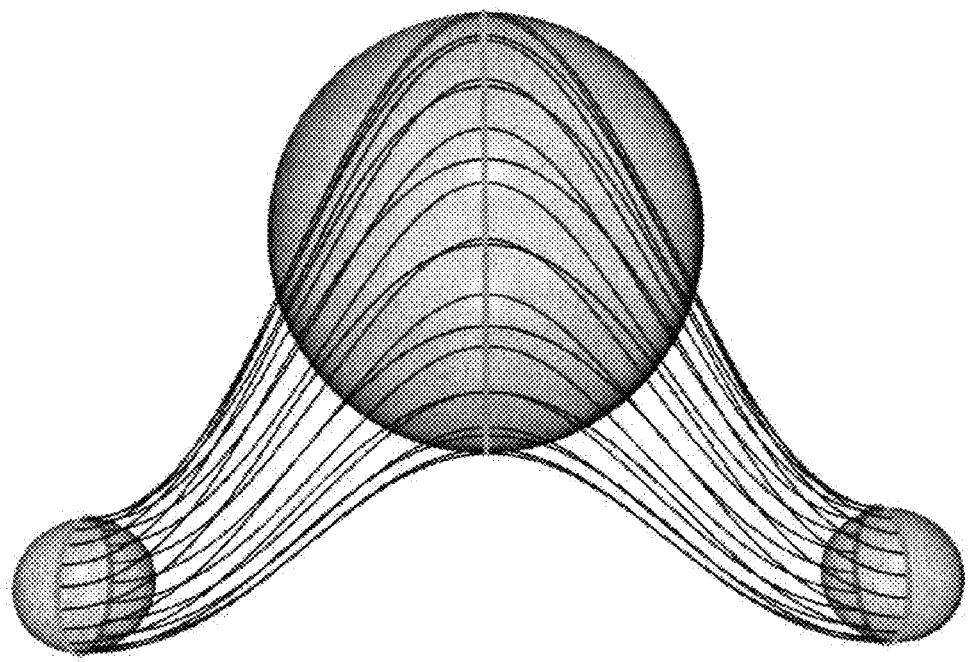
FIG. 11 illustrates skin passing through a ball in ball skinning according to an exemplary embodiment of the present invention.
Figure 11:
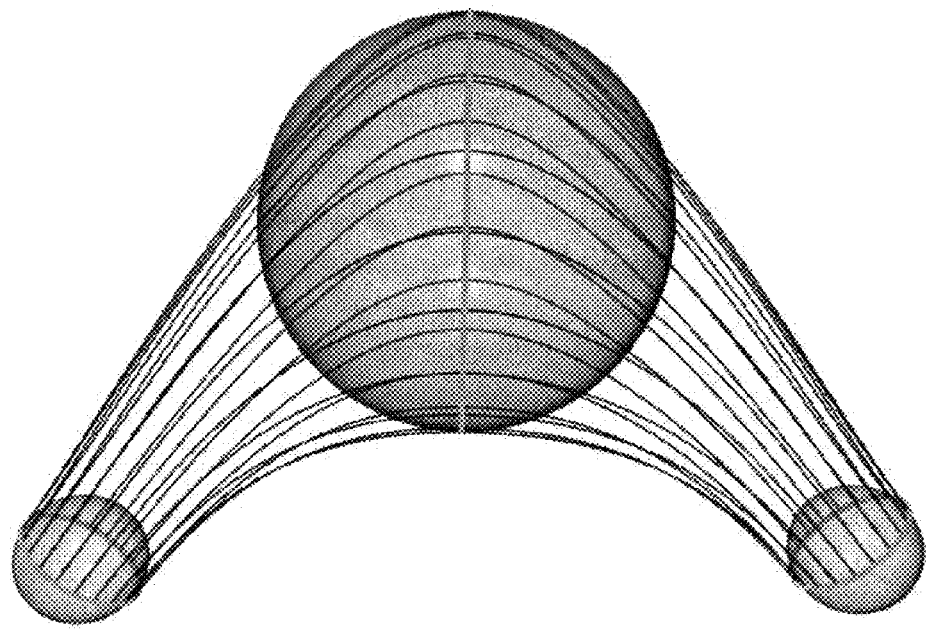

Note that the skin generated by a method according to an exemplary embodiment of the present invention may pass through a ball (shown in FIG. 11(b)), since it is only constrained to be tangent to the ball at the circle of intersection. For points not in the circle's plane, the skin may be larger or smaller than the ball. Thus, the skin does not provide an exact envelope of the balls, but rather, an approximating envelope. In an application of modeling blood vessels, this is an acceptable solution since the ball itself is a geometric proxy of the local vessel geometry.

In this disclosure, we presented a method for optimally skinning an ordered set of 3D balls. Our formulation of the problem requires that the skin be modeled by a circle of contact with each ball and that the skin be tangent to the ball along this circle. We have presented novel derivations resulting in differential equations that minimize a convex combination of the surface area and mean curvature of a third order polynomial spline surface subject to these constraints. Starting with an initial skin, we evolve the skin's parameters until convergence. Experimental results demonstrate the viability of this method.

Derivatives of the coefficients of the first fundamental form are now provided.

The derivatives for the j the ball's ($j \in [i-1, i]$) coefficients of the first fundamental form with respect to $w^k \in w^i = [\theta^i, \phi^i, d^i]^T$ are given by $$\frac{\partial E^j}{\partial w^k} = 2 S_u^j \cdot \frac{\partial S_u^j}{\partial w^k}$$

$$\frac{\partial F^j}{\partial w^k} = S_u^j \cdot \frac{\partial S_v^j}{\partial \omega^k} + S_v^j \cdot \frac{\partial S_u^j}{\partial w^k}$$

$$\frac{\partial G^j}{\partial w^k} = 2 S_v^j \cdot \frac{\partial S_v^j}{\partial w^k}$$

where $$S_u^j = A_u^j v^3 + B_u^j v^2 + C_u^j v + D_u^j$$

$$\frac{\partial S_u^j}{\partial w^k} = \frac{\partial A_u^j}{\partial w^k} v^3 + \frac{\partial B_u^j}{\partial w^k} v^2 + \frac{\partial C_u^j}{\partial w^k} v + \frac{\partial D_u^j}{\partial w^k}$$

$$S_v^j = 3 A^j v^2 + 2 B^j v + C^j$$

$$\frac{\partial S_v^j}{\partial w^k} = 3 \frac{\partial A^j}{\partial w^k} v^2 + 2 \frac{\partial B^j}{\partial \omega^k} v + \frac{\partial C^j}{\partial w^k}$$

and $$\frac{\partial A^j}{\partial w^k} = \begin{cases} 2 \frac{\partial p^j}{\partial w^k} + t^j \frac{\partial N^j}{\partial w^k}, & j = i \\ -2 \frac{\partial p^{j+1}}{\partial w^k} + t^{j+1} \frac{\partial N^{j+1}}{\partial w^k}, & j = i-1 \end{cases}$$

-continued $$\frac{\partial B^j}{\partial w^k} = \begin{cases} -3\frac{\partial p^j}{\partial w^k} - 2t^j \frac{\partial N^j}{\partial w^k}, & j=i \\ 3\frac{\partial p^{j+1}}{\partial w^k} - t^{j+1}\frac{\partial N^{j+1}}{\partial w^k}, & j=i-1 \end{cases}$$

$$\frac{\partial C^j}{\partial w^k} = \begin{cases} t^j \frac{\partial N^j}{\partial w^k}, & j=i \\ 0, & j=i-1 \end{cases}$$

$$\frac{\partial D^j}{\partial w^k} = \begin{cases} \frac{\partial p^j}{\partial w^k}, & j=i \\ 0, & j=i-1 \end{cases}$$

$$A_u^j = -2p_u^{j+1} + 2p_u^j$$

$$B_u^j = 3p_u^{j+1} - 3p_u^j$$

$$C_u^j = 0$$

$$D_u^j = p_u^j$$

$$\frac{\partial A_u^j}{\partial w^k} = \begin{cases} 2\frac{\partial p_u^j}{\partial w^k}, & j=i \\ -2\frac{\partial p_u^{j+1}}{\partial w^k}, & j=i-1 \end{cases}$$

$$\frac{\partial B_u^j}{\partial w^k} = \begin{cases} -3\frac{\partial p_u^j}{\partial w^k}, & j=i \\ 3\frac{\partial p_u^{j+1}}{\partial w^k}, & j=i-1 \end{cases}$$

$$\frac{\partial C_u^j}{\partial w^k} = 0$$

$$\frac{\partial D_u^j}{\partial w^k} = \begin{cases} \frac{\partial p_u^j}{\partial w^k}, & j=i \\ 0, & j=i-1 \end{cases}$$

$$\frac{\partial p^i}{\partial \theta^i} = a^i \frac{\partial R^i}{\partial \theta^i}(x\cos u + y\sin u)$$

$$\frac{\partial p^i}{\partial \phi^i} = a^i \frac{\partial R^i}{\partial \phi^i}(x\cos u + y\sin u)$$

$$p_u^i = a^i R^i(-x\sin u + y\cos u)$$

$$\frac{\partial p_u^i}{\partial \theta^i} = a^i \frac{\partial R^i}{\partial \theta^i}(-x\sin u + y\cos u)$$

$$\frac{\partial p_u^i}{\partial \phi^i} = a^i \frac{\partial R^i}{\partial \phi^i}(-x\sin u + y\cos u)$$

and $$\frac{\partial R^i}{\partial \theta^i} = \begin{bmatrix} -\sin\theta^i\cos\phi^i & -\cos\theta^i & -\sin\theta^i\sin\phi^i \\ \cos\theta^i\cos\phi^i & -\sin\theta^i & \cos\theta^i\sin\phi^i \\ 0 & 0 & 0 \end{bmatrix}$$

$$\frac{\partial R^i}{\partial \phi^i} = \begin{bmatrix} -\cos\theta^i\sin\phi^i & 0 & \cos\theta^i\cos\phi^i \\ -\sin\theta^i\sin\phi^i & 0 & \sin\theta^i\cos\phi^i \\ -\cos\phi^i & 0 & -\sin\phi^j \end{bmatrix}$$

and $$\frac{\partial N^i}{\partial \theta^i} = [-\sin\theta^i\sin\phi^i, \cos\theta^i\sin\phi^i, 0]^T$$

$$\frac{\partial N^i}{\partial \phi^i} = [\cos\theta^i\cos\phi^i, \sin\theta^i\cos\phi^i, -\sin\phi^i]^T$$

Derivatives of the coefficients of the second fundamental form are now provided.

The derivatives for the j the ball's ($j \in [i-1, i]$) coefficients of the second fundamental form with respect to $w^k \in w^i = [\theta^i, \phi^i, d^i]^T$ are given by $$\frac{\partial e^j}{\partial w^k} = \frac{\partial M^j}{\partial w^k} \cdot S_{uu}^j + M^j \cdot \frac{\partial S_{uu}^j}{\partial w^k}$$

$$\frac{\partial f^j}{\partial w^k} = \frac{\partial M^j}{\partial w^k} \cdot S_{uv}^j + M^j \cdot \frac{\partial S_{uv}^j}{\partial w^k}$$

$$\frac{\partial g^j}{\partial w^k} = \frac{\partial M^j}{\partial w^k} \cdot S_{vv}^j + M^j \cdot \frac{\partial S_{vv}^j}{\partial w^k}$$

where $$M^j = \frac{S_u^j \times S_v^j}{\|S_u^j \times S_v^j\|}$$

$$\frac{\partial M^j}{\partial w^k} = \frac{\frac{\partial S_u^j}{\partial w^k} \times S_v^j}{\|S_u^j \times S_v^j\|} + \frac{S_u^j \times \frac{\partial S_v^j}{\partial w^k}}{\|S_u^j \times S_v^j\|} - \frac{\left[(S_u^j \times S_v^j) \cdot \left(\frac{\partial S_u^j}{\partial w^k} \times S_v^j + S_u^j \times \frac{\partial S_v^j}{\partial w^k}\right)\right] S_u^j \times S_v^j}{\|S_u^j \times S_v^j\|^3}$$

where $$S_u^j, S_v^j, \frac{\partial S_u^j}{\partial w^k}, \text{ and } \frac{\partial S_v^j}{\partial w^k}$$

are given in Appendix A, and $$S_{uu}^j = A_{uu}^j v^3 + B_{uu}^j v^2 + C_{uu}^j v + D_{uu}^j$$

$$S_{uv}^j = 3A_u^j v^2 + 2B_u^j v + C_u^j$$

$$S_{vv}^j = 6A^j v + 2B^j$$

$$\frac{\partial S_{uu}^j}{\partial w^k} = \frac{\partial A_{uu}^j}{\partial w^k} v^3 + \frac{\partial B_{uu}^j}{\partial w^k} v^2 + \frac{\partial C_{uu}^j}{\partial w^k} v + \frac{\partial D_{uu}^j}{\partial w^k}$$

$$\frac{\partial S_{uv}^j}{\partial w^k} = 3\frac{\partial A_u^j}{\partial w^k} v^2 + 2\frac{\partial B_u^j}{\partial w^k} v + \frac{\partial C_u^j}{\partial w^k}$$

$$\frac{\partial S_{vv}^j}{\partial w^k} = 6\frac{\partial A^j}{\partial w^k} v + 2\frac{\partial B^j}{\partial w^k}$$

and $$\frac{\partial A_{uu}^j}{\partial w^k} = \begin{cases} 2\frac{\partial p_{uu}^j}{\partial w^k}, & j=i \\ -2\frac{\partial p_{uu}^{j+1}}{\partial w^k}, & j=i-1 \end{cases}$$

$$\frac{\partial B_{uu}^j}{\partial w^k} = \begin{cases} -3\frac{\partial p_{uu}^j}{\partial w^k}, & j=i \\ 3\frac{\partial p_{uu}^{j+1}}{\partial w^k}, & j=i-1 \end{cases}$$

$$\frac{\partial C_{uu}^j}{\partial w^k} = 0$$

$$\frac{\partial D_{uu}^j}{\partial w^k} = \begin{cases} \frac{\partial p_{uu}^j}{\partial w^k}, & j=i \\ 0, & j=i-1 \end{cases}$$

where $$p_{uu}^i = a^i R^i(-x\cos u - y\sin u)$$

$$\frac{\partial p_{uu}^i}{\partial \theta^i} = a^i \frac{\partial R^i}{\partial \theta^i}(-x\cos u - y\sin u)$$

$$\frac{\partial p_{uu}^i}{\partial \phi^i} = a^i \frac{\partial R^i}{\partial \phi^i}(-x\cos u - y\sin u)$$

Figure 12:
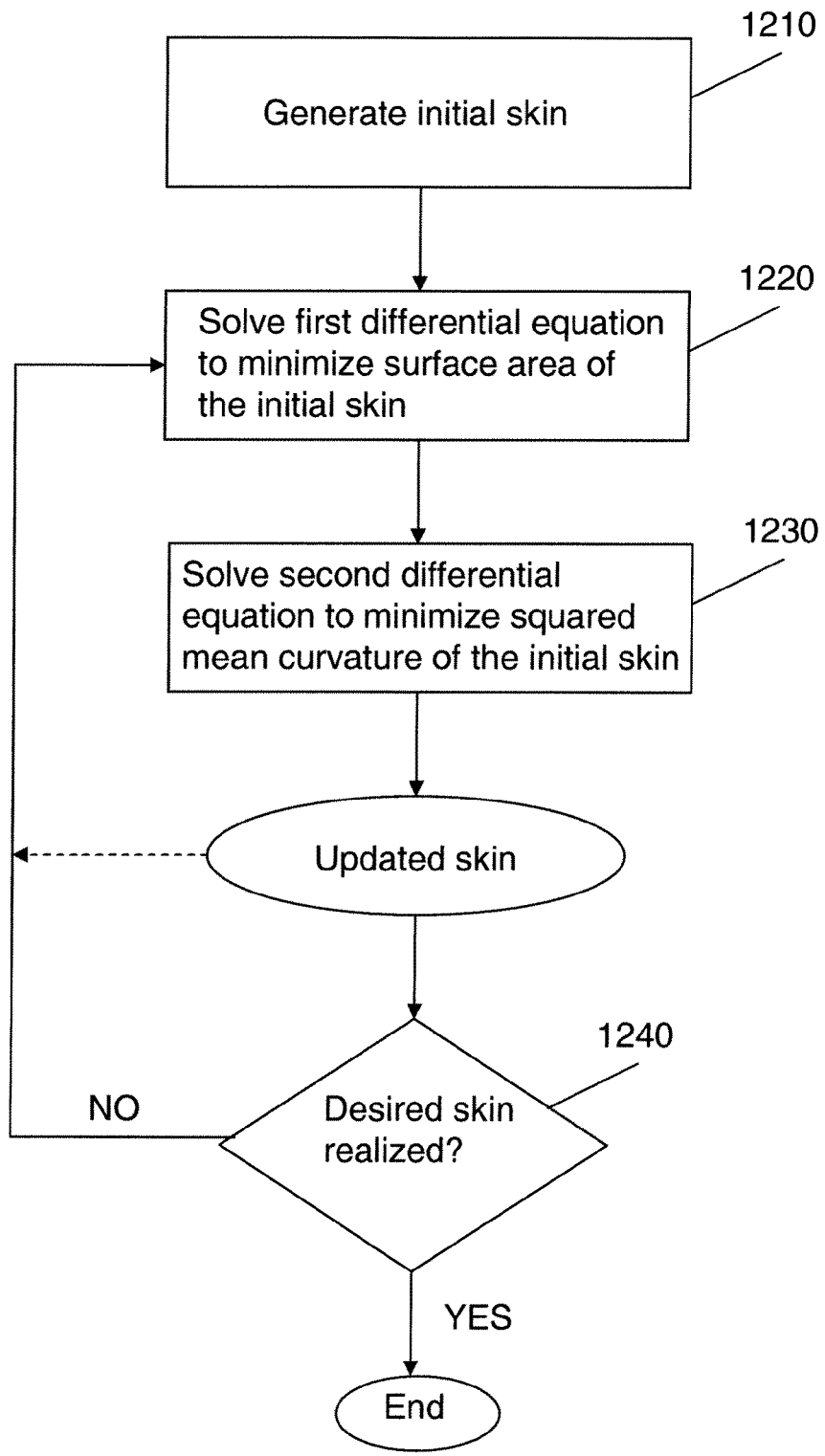
FIG. 12 is a flowchart illustrating a method of ball skinning according to an exemplary embodiment of the present invention.

FIG. 12 is a flowchart illustrating a method of ball skinning according to an exemplary embodiment of the present invention. As shown in FIG. 12, an initial skin S(u,v) is generated (1210). Differential Equation 13 is solved to minimize the initial skin's surface area (1220). Differential Equation 21 is solved to minimize a squared mean curvature of the initial skin's surface (1230). Steps 1220 and 1230 give an updated skin. Steps 1220 and 1230 are repeated using each newly generated updated skin until a desired skin is realized (1240). It is noted that the updated skin can be achieved by only solving one of the differential equations. It is further noted that when both differential equations are used to generate the updated skin, Equation 23 is used to combine the differential equations. It is further noted that the number of iterations can be determined based on a gradient descent procedure represented by Equation 24.

Figure 13:
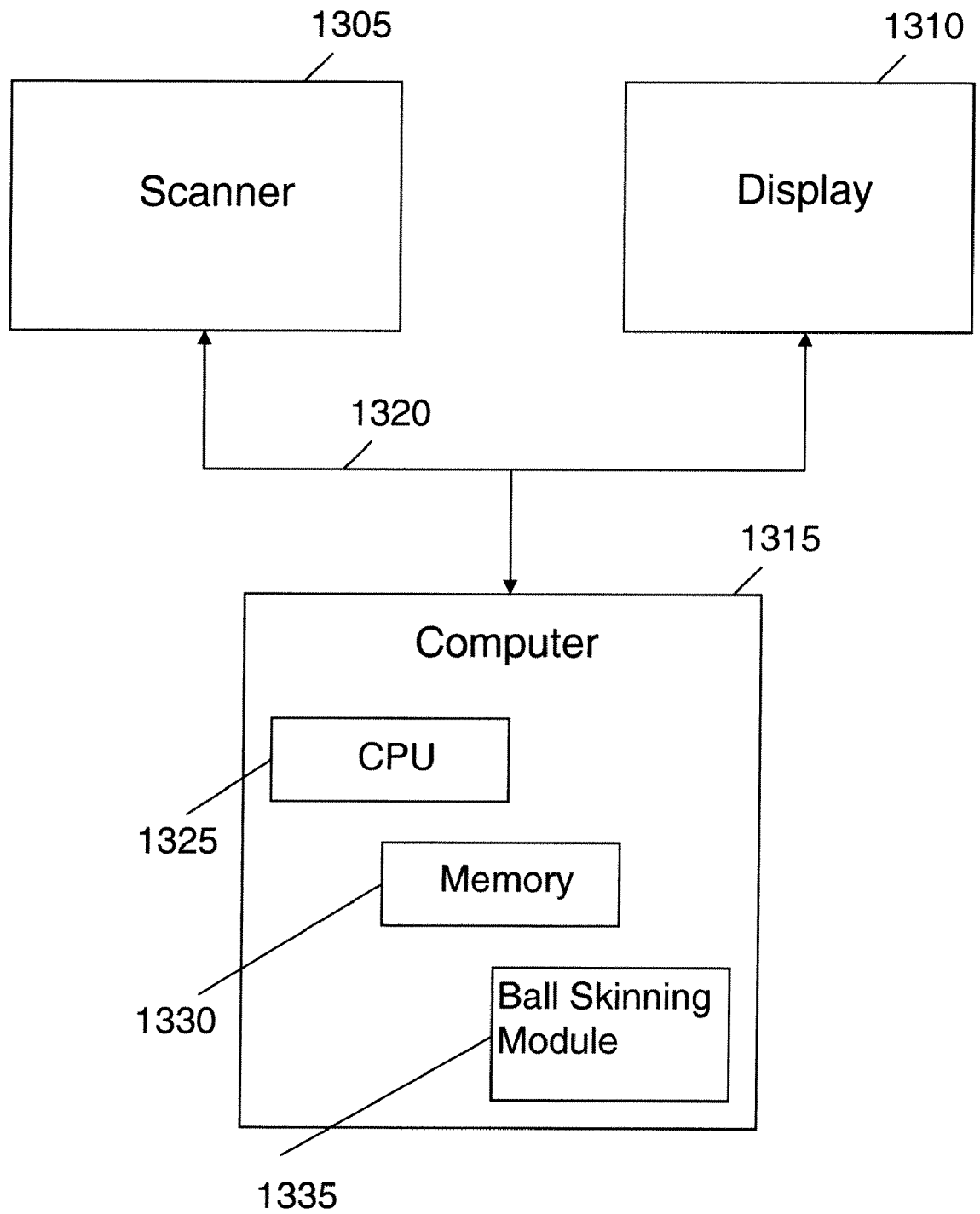
FIG. 13 is a block diagram of a system in which exemplary embodiments of the present invention may be implemented.

A system in which exemplary embodiments of the present invention may be implemented will now be described with reference to FIG. 13. As shown in FIG. 13, the system includes a scanner 1305, a computer 1315 and a display 1310 connected over a wired or wireless network 1320. The scanner 1305 may be an image scanner that uses a charge-coupled device (CCD) or Contact Image Sensor (CIS), or it may be a magnetic resonance (MR) or computed tomography (CT) scanner, for example. The computer 1315 includes, inter alia, a central processing unit (CPU) 1325, a memory 1330 and a ball skinning module 1335 that includes program code for executing methods in accordance with exemplary embodiments of the present invention. The display 1310 is a computer screen, for example.

It is understood that the present invention may be implemented in various forms of hardware, software, firmware, special purpose processors, or a combination thereof. In one embodiment, the present invention may be implemented in software as an application program tangibly embodied on a program storage device (e.g., magnetic floppy disk, RAM, CD ROM, DVD, ROM, and flash memory). The application program may be uploaded to, and executed by, a machine comprising any suitable architecture.

It is also understood that because some of the constituent system components and method steps depicted in the accompanying figures may be implemented in software, the actual connections between the system components (or the process steps) may differ depending on the manner in which the present invention is programmed. Given the teachings of the present invention provided herein, one of ordinary skill in the art will be able to contemplate these and similar implementations or configurations of the present invention.

It is further understood that the above description is only representative of illustrative embodiments. For convenience of the reader, the above description has focused on a representative sample of possible embodiments, a sample that is illustrative of the principles of the invention. The description has not attempted to exhaustively enumerate all possible variations. That alternative embodiments may not have been presented for a specific portion of the invention, or that further undescribed alternatives may be available for a portion, is not to be considered a disclaimer of those alternate embodiments. Other applications and embodiments can be implemented without departing from the spirit and scope of the present invention.

It is therefore intended, that the invention not be limited to the specifically described embodiments, because numerous permutations and combinations of the above and implementations involving non-inventive substitutions for the above can be created, but the invention is to be defined in accordance with the claims that follow. It can be appreciated that many of those undescribed embodiments are within the literal scope of the following claims, and that others are equivalent.

What is claimed is:

1. A method of computing a continuous interpolation of a discrete set of three-dimensional (3D) balls, comprising:
   generating an initial skin using a processor of a computer, wherein the initial skin is generated by using machine code excutable by the processor to form a surface of the initial skin comprised of splines, wherein the splines touch each ball along a circle that is tangent to the ball;
   solving a first differential equation to minimize the initial skin's surface area or solving a second differential equation to minimize a squared mean curvature of the initial skin's surface,
   wherein the result of solving the first or second differential equations is an updated skin; and
   repeating the steps of solving the first or second differential equations for the updated skin, and then, repeating the steps of solving the first or second differential equations for each subsequently updated skin until a desired skin is realized,
   where a circle on a ball $B^i$ is in a plane with mormal $N^i = [\cos\theta^i \sin\phi^i, \sin\phi^i \sin\phi^i, \cos\phi^i]^T$ that passes through the ball center $c^i$ and intersects the ball $B^i$, $q(u)$ is a point on the circle and is defined by $q(u) = \hat{x}\cos u + \hat{y}\sin u$, and a point $p^i(u)$ on a circle through which spline passes is defined by $p^i(u) = c^i + r^i q(u)$, where $r^i$ is a radius of an i th ball, and $R^i$ is a rotation matrix specified by $N^i$.

2. The method of claim 1, wherein the rotation matrix $R^i$ is $$R^i = R(\theta^i, \phi^i) = \begin{bmatrix} \cos\theta^i\cos\phi^i & -\sin\theta^i & \cos\theta^i\sin\phi^i \\ \sin\theta^i\cos\phi^i & \cos\theta^i & \sin\theta^i\sin\phi^i \\ -\sin\phi^i & 0 & \cos\phi^i \end{bmatrix}.$$

3. The method of claim 1, wherein the initial skin is represented by $S(u, v)$, where $S(u, v)$ is a collection of continuous segments $S^i(u, v)$, where an $S^i(u, v)$ is specified by $A^i(u)$, $B^i(u), C^i(u), D^i(u)$, where $A^i(u) = -2p^{i+1}(u) + 2p^i(u) + t^i N^i + t^{i+1} N^{i+1}$, $B^i(u) = 3p^{i+1}(u) - 3p^i(u) - 2t^i N^i - t^{i+1} N^{i+1}$, $C^i(u) = t^i N^i$, and $D^i(u) = p^i(u)$.

4. The method of claim 3, wherein the first differential equation is represented by $$\frac{\partial J^a}{\partial w^k} = \frac{1}{2} \int\int \frac{\frac{\partial E^i}{\partial w^k}G^i + E^i\frac{\partial G^i}{\partial w^k} - 2F^i\frac{\partial F^i}{\partial w^k}}{[E^i G^i - (F^i)^2]^{\frac{1}{2}}} du dv +$$

$$\frac{1}{2} \int\int \frac{\frac{\partial E^{i-1}}{\partial w^k}G^{i-1} + E^{i-1}\frac{\partial G^{i-1}}{\partial w^k} - 2F^{i-1}\frac{\partial F^{i-1}}{\partial w^k}}{[E^{i-1} G^{i-1} - (F^{i-1})^2]^{\frac{1}{2}}} du dv.$$

5. The method of claim 4, where $J^a = \iint\sqrt{EG-F^2}dudv$, $w^k \in [\theta^i, \phi^i] \forall i$, $E = S_u \cdot S_u$, $F = S_u \cdot S_v$, and $G = S_v \cdot S_v$.

6. The method of claim 3, wherein the second differential equation is represented by $$\frac{\partial J^c}{\partial w^k} =$$

$$\int\int 2H^i \left[ \frac{\frac{\partial e^i}{\partial w^k}G^i + e^i\frac{\partial G^i}{\partial w^k} - 2\frac{\partial f^i}{\partial w^k}F^i - 2f^i\frac{\partial F^i}{\partial w^k} + \frac{\partial g^i}{\partial w^k}E^i + g^i\frac{\partial E^i}{\partial w^k}}{2(E^i G^i - (F^i)^2)} - \right.$$

-continued $$\frac{(e^i G^i - 2f^i F^i + g^i E^i) \cdot \left(\frac{\partial E^i}{\partial w^k} G^i + E^i \frac{\partial G^i}{\partial w^k} - 2\frac{\partial F^i}{\partial w^k} F^i\right)}{2(E^i G^i - (F^i)^2)^2}\Bigg] du\, dv +$$

$$\int\int 2H^{i-1}\left[\frac{\frac{\partial e^{i-1}}{\partial w^k} G^{i-1} + e^{i-1}\frac{\partial G^{i-1}}{\partial w^k} - 2\frac{\partial f^{i-1}}{\partial w^k} F^{i-1} - 2f^{i-1}\frac{\partial F^{i-1}}{\partial w^k} + \frac{\partial g^{i-1}}{\partial w^k} E^{i-1} + g^{i-1}\frac{\partial E^{i-1}}{\partial w^k}}{2(E^{i-1}G^{i-1} - (F^{i-1})^2)} - \right.$$

$$\left.\frac{(e^{i-1}G^{i-1} - 2f^{i-1}F^{i-1} + g^{i-1}E^{i-1}) \cdot \left(\frac{\partial E^{i-1}}{\partial w^k}G^{i-1} + E^{i-1}\frac{\partial G^{i-1}}{\partial w^k} - 2\frac{\partial F^{i-1}}{\partial w^k}F^{i-1}\right)}{2(E^{i-1}G^{i-1} - (F^{i-1})^2)^2}\right] du\, dv.$$

7. The method of claim 6, where $J^c = \iint H^2 du\, dv$, $w^k \in [\theta^i,\,]\forall i$, $E = S_u \cdot S_u$, $F = S_u \cdot S_v$, $G = S_v \cdot S_v$, $e = M \cdot S_{uu}$, $f = m \cdot S_{uv}$, and $g = M \cdot S_{vv}$, where M is the surface normal.

8. The method of claim 3, further comprising:
combining the first and second differential equations to generate the updated skin, wherein the first and second differential equations are combined by the following equation $$\frac{\partial J}{\partial w^k} = (1-k)\frac{\partial J^a}{\partial w^k} + \frac{\partial J^c}{\partial w^k},$$

where $$\frac{\partial J^a}{\partial w^k}$$

is the first differential equation and $$\frac{\partial J^c}{\partial w^k}$$

is the second differential equation.

9. The method of claim 8, wherein the first differential equation is represented by $$\frac{\partial J^a}{\partial w^k} = \frac{1}{2}\int\int \frac{\frac{\partial E^i}{\partial w^k}G^i + E^i\frac{\partial G^i}{\partial w^k} - 2F^i\frac{\partial F^i}{\partial w^k}}{[E^i G^i - (F^i)^2]^{\frac{1}{2}}} du\, dv +$$

$$\frac{1}{2}\int\int \frac{\frac{\partial E^{i-1}}{\partial w^k}G^{i-1} + E^{i-1}\frac{\partial G^{i-1}}{\partial w^k} - 2F^{i-1}\frac{\partial F^{i-1}}{\partial w^k}}{[E^{i-1}G^{i-1} - (F^{i-1})^2]^{\frac{1}{2}}} du\, dv.$$

10. The method of claim 9, where $J^a = \iint \sqrt{EG-F^2}\, du\, dv$, $w^k \in [\theta^i,\phi^i,]\forall i$, $E = S_u \cdot S_u$, $F = S_u \cdot S_v$, and $G = S_v \cdot S_v$.

11. The method of claim 8, wherein the second differential equation is represented by $$\frac{\partial J^c}{\partial w^k} =$$

$$\int\int 2H^i\left[\frac{\frac{\partial e^i}{\partial w^k}G^i + e^i\frac{\partial G^i}{\partial w^k} - 2\frac{\partial f^i}{\partial w^k}F^i - 2f^i\frac{\partial F^i}{\partial w^k} + \frac{\partial g^i}{\partial w^k}E^i + g^i\frac{\partial E^i}{\partial w^k}}{2(E^i G^i - (F^i)^2)} - \right.$$

$$\left.\frac{(e^i G^i - 2f^i F^i + g^i E^i)\cdot\left(\frac{\partial E^i}{\partial w^k}G^i + E^i\frac{\partial G^i}{\partial w^k} - 2\frac{\partial F^i}{\partial w^k}F^i\right)}{2(E^i G^i - (F^i)^2)^2}\right] du\, dv +$$

$$\int\int 2H^{i-1}\left[\frac{\frac{\partial e^{i-1}}{\partial w^k}G^{i-1} + e^{i-1}\frac{\partial G^{i-1}}{\partial w^k} - 2\frac{\partial f^{i-1}}{\partial w^k}F^{i-1} - 2f^{i-1}\frac{\partial F^{i-1}}{\partial w^k} + \frac{\partial g^{i-1}}{\partial w^k}E^{i-1} + g^{i-1}\frac{\partial E^{i-1}}{\partial w^k}}{2(E^{i-1}G^{i-1} - (F^{i-1})^2)} - \right.$$

$$\left.\frac{(e^{i-1}G^{i-1} - 2f^{i-1}F^{i-1} + g^{i-1}E^{i-1})\cdot\left(\frac{\partial E^{i-1}}{\partial w^k}G^{i-1} + E^{i-1}\frac{\partial G^{i-1}}{\partial w^k} - 2\frac{\partial F^{i-1}}{\partial w^k}F^{i-1}\right)}{2(E^{i-1}G^{i-1} - (F^{i-1})^2)^2}\right] du\, dv.$$

12. The method of claim 11, where $J^c = \iint H^2 du\, dv$, $w^k \in [\theta^i,\phi^i,]\forall i$, $E = S_u \cdot S_u$, $F = S_u \cdot S_v$, $G = S_v \cdot S_v$, $e = M \cdot S_{uu}$, $f = M \cdot S_{uv}$, and $g = M \cdot S_{vv}$, where M is the surface normal.

13. The method of claim 8, wherein the first and second differential equations are used in a gradient descent procedure to find the desired skin.

14. The method of claim 13, wherein the gradient descent procedure manipulates parameters $w^i = [\theta^i,\phi^i]^T$ of each ball i, where $w^i(n+1) = w^i(n) - \Delta t \nabla J_{w^i(n)}$, $\forall i$ to find the desired skin.

15. A method of modeling a tubular structure, comprising:
imaging a tubular structure;
placing a plurality of balls in the tubular structure; and
finding a skin that smoothly interpolates the balls,
wherein finding the skin comprises:
generating an initial skin, wherein the initial skin is a surface comprised of splines and wherein the splines touch each ball along a circle that is tangent to the ball;
solving a first differential equation to minimize the initial skin's surface area or solving a second differential equation to minimize a squared mean curvature of the initial skin's surface,
wherein the result of solving the first or second differential equations is an updated skin; and
repeating the steps of solving the first or second differential equations for the updated skin, and then, repeating the steps of solving the first or second differential equations for each subsequently updated skin until the skin that smoothly interpolates the balls is realized,
wherein the skin that smoothly interpolates the balls is a model of the tubular structure,
where a circle on a ball $B^i$ is in a plane with normal $N^i = [\cos\theta^i \sin\phi^i, \sin\phi^i \sin\phi^i, \cos\phi^i]^T$ that passes through the ball center $c^i$ and intersects the ball $B^i$, q(u) is a point on the circle and is defined by $q(u) = \hat{x}\cos u + \hat{y}\sin u$, and a point $p^i(u)$ on a circle through which a spline passes is defined by $p^i(u) = c^i + r^i R^i q(u)$, where $r^i$ is a radius of an i th ball, and $R^i$ is a rotation matrix specified by $N^i$.

16. The method of claim 15, wherein the tubular structure is an anatomical structure.

17. The method of claim 15, wherein the tubular structure is imaged by a scanner.

18. The method of claim 15, wherein the balls are ordered.

19. A system of computing a continuous interpolation of a discrete set of three-dimensional (3D) balls, comprising:
   a memory device for storing a program; and
   a processor in communication with the memory device, the processor operative with the program to perform a method, the method comprising:
   generating an initial skin, wherein the initial skin is a surface comprised of splines and wherein the splines touch each ball along a circle that is tangent to the ball;
   solving a first differential equation to minimize the initial skin's surface area or solving a second differential equation to minimize a squared mean curvature of the initial skin's surface,
   wherein the result of solving the first or second differential equations is an updated skin; and
   repeating the steps of solving the first or second differential equations for the updated skin, and then, repeating the steps of solving the first or second differential equations for each subsequently updated skin until a desired skin is realized,
   where a circle on a ball $B^i$ is in a plane with normal $N^i=[\cos\theta^i \sin\phi^i, \sin\phi^i \sin\phi^i, \cos\phi^i]^T$ that passes through the ball center $c^i$ and intersects the ball $B^i$, $q(u)$ is a point on the circle and is defined by $q(u)=\hat{x}\cos u+\hat{y}\sin u$, and a point $p^i(u)$ on a circle through which spline passes is defined by $p^i(u)=c^i+r^i R^i q(u)$, where $r^i$ is a radius of an i th ball, and $R^i$ is a rotation matrix specified by $N^i$.

* * * * *